United States Patent [19]
Unruh et al.

[11] Patent Number: 4,626,984
[45] Date of Patent: Dec. 2, 1986

[54] REMOTE COMPUTER CONTROL FOR IRRIGATION SYSTEMS

[75] Inventors: Rudy R. Unruh; James A. Lamb; Richard A. Tejral, all of Omaha, Nebr.

[73] Assignee: Valmont Industries, Inc., Valley, Nebr.

[21] Appl. No.: 645,481

[22] Filed: Aug. 29, 1984

[51] Int. Cl.⁴ .................. G06F 15/46; G06F 15/16
[52] U.S. Cl. ..................... 364/132; 239/69; 340/825.06; 364/420
[58] Field of Search ................ 364/140–147, 364/400, 420, 510, 131–135, 200 MS File, 900 MS File; 239/63, 66, 70, 71, 69; 340/825.06, 825.54, 825.55

[56] References Cited

U.S. PATENT DOCUMENTS

| | | | |
|---|---|---|---|
| 3,274,584 | 9/1966 | Morgan et al. | 340/347 |
| 3,514,624 | 5/1970 | Jans et al. | 307/41 |
| 3,529,618 | 9/1970 | Rinkewich | 137/119 |
| 3,548,102 | 12/1970 | Schaum et al. | 179/2 |
| 3,553,376 | 1/1971 | Bogaart et al. | 179/2 |
| 3,577,080 | 5/1971 | Cannalte | 340/825.06 |
| 3,599,867 | 8/1971 | Griswold et al. | 239/63 |
| 3,604,943 | 9/1971 | Bayer | 307/41 |
| 3,622,992 | 11/1971 | Schuenwitz | 340/825.06 |
| 3,647,971 | 3/1972 | Cushman | 179/2 A |
| 3,647,971 | 3/1972 | Cushman | 179/2 A |
| 3,702,904 | 11/1972 | Bard | 179/2 A |
| 3,710,244 | 1/1973 | Rauchwerger | 324/61 R |
| 3,723,753 | 3/1973 | Davis | 307/41 |
| 3,723,827 | 3/1973 | Griswold et al. | 307/41 X |
| 3,729,710 | 4/1973 | Sherwin | 340/310 |
| 3,747,620 | 7/1973 | Kah, Jr. | 137/119 |

(List continued on next page.)

OTHER PUBLICATIONS

Lamb et al.—"Microprocessor Automation of a Solid--Set Irrigation Facility for Research and Demonstration"—Journal 7273 of Nebraska Agricultural Experiment Station.
ETI Irrigation Systems brochure—"Overseer-Pivotender—A Remote Irrigation Monitor Providing 24 Hour Monitoring"—Oct. 28, 1976—Fort Collins, Colo.
ATS Telemetry Systems brochure—Boulder, Colo. 80301.
Pivotrol Corporation brochures—"Center Pivot Monitor & Control System"; Irrigation, Monitoring and Control System; Irrigation, Monitor & Control Systems, Route 2, Box 41A, Grant, Neb. 69140.
Schleicher—"Dial '0' for Water"—IA—Nov., Dec. 1976—pp. 20, 21.
Motorola Corp.—Various brochures related to "INTRAC 2000 Alarm and Control System"—; Schaumburg, Ill. 60196.
Farming Technology Corp.—Various brochures related to the "IMS-2" System—Boulder, Colo. 80301.
American Society of Agricultural Engineers—Paper Nos. 82-2533; 82-2534; 82-2535; 83-2002; 83-2003 and 83-3027, Describing microcomputer monitor/control systems for remote monitor and control of multiple center-pivot irrigation systems—St. Joseph, Mich. 49085.
K&S Systems brochure—"Remote Rainmaster Irrigation Pivot Remote Monitor and Control System'—Bellevue, Wash. 98052.

Primary Examiner—Joseph Ruggiero
Attorney, Agent, or
Firm—Zarley, McKee, Thomte, Voorhees & Sease

[57] ABSTRACT

A remote computer system for controlling a plurality of irrigation systems, each of which has a local controller for controlling an individual system, includes an intelligent remote unit associated with each local controller, each intelligent remote unit having a computer with a stored program for fully independently operating the local controller and the irrigation system associated therewith. A central base station controller includes its own computer which is linked by a communications link with each of the intelligent remote units, the stored program in the base station computer permitting operator monitor and control of the various parameters being monitored and controlled by the intelligent remote units.

40 Claims, 33 Drawing Figures

4,626,984

Page 2

U.S. PATENT DOCUMENTS

| | | | |
|---|---|---|---|
| 3,812,462 | 5/1974 | Crossland et al. | 340/825.06 |
| 3,836,959 | 9/1974 | Pao et al. | 340/825.06 |
| 3,843,056 | 10/1974 | Nye | 239/64 |
| 3,868,640 | 2/1975 | Binnie et al. | 340/825.06 |
| 3,869,854 | 3/1975 | Church | 239/70 X |
| 3,906,445 | 9/1975 | Beckmann et al. | 371/16 |
| 3,951,339 | 4/1976 | DuFresne | 239/66 |
| 3,964,685 | 6/1976 | Chauvigne | 239/66 |
| 3,980,824 | 9/1976 | Lamb et al. | 178/67.1 |
| 4,007,458 | 2/1977 | Hollabaugh | 340/310 R |
| 4,015,366 | 4/1977 | Hall, III | 239/69 X |
| 4,016,360 | 4/1977 | Cane | 179/2 A |
| 4,061,927 | 12/1977 | Link | 307/41 |
| 4,082,117 | 4/1978 | Peckham | 361/357 |
| 4,095,050 | 6/1978 | Beachem | 179/2 A |
| 4,101,786 | 7/1978 | Ruggles et al. | 307/38 |
| 4,165,532 | 8/1979 | Kendall et al. | 364/420 |
| 4,176,395 | 11/1979 | Evelyn-Veere et al. | 364/420 |
| 4,185,650 | 1/1980 | Neves | 137/15 |
| 4,189,776 | 2/1979 | Kendall | 364/420 |
| 4,209,131 | 6/1980 | Barash et al. | 239/68 |
| 4,234,926 | 11/1980 | Wallace et al. | 364/131 X |
| 4,241,375 | 12/1980 | Ruggles | 361/166 |
| 4,251,858 | 2/1981 | Cambigue et al. | 364/132 |
| 4,253,148 | 2/1981 | Johnson et al. | 364/200 |
| 4,276,023 | 6/1981 | Phillips et al. | 433/85 |
| 4,304,989 | 12/1981 | Vos | 137/624.2 X |
| 4,418,381 | 11/1983 | Molusis et al. | 364/131 |
| 4,457,772 | 7/1984 | Haynes et al. | 364/138 X |
| 4,459,655 | 7/1984 | Willemin | 364/132 |
| 4,539,655 | 9/1985 | Trussel et al. | 364/900 |

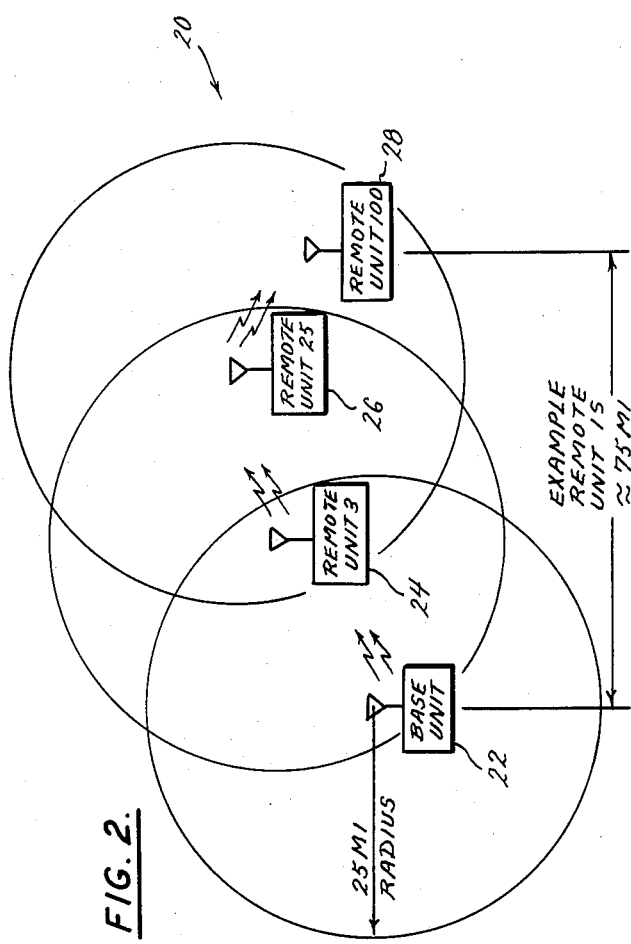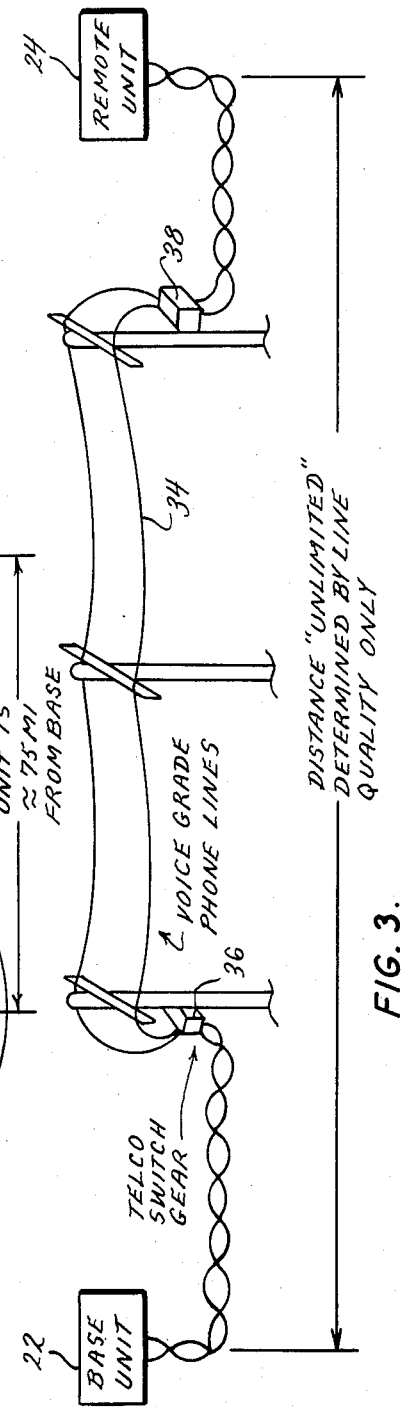

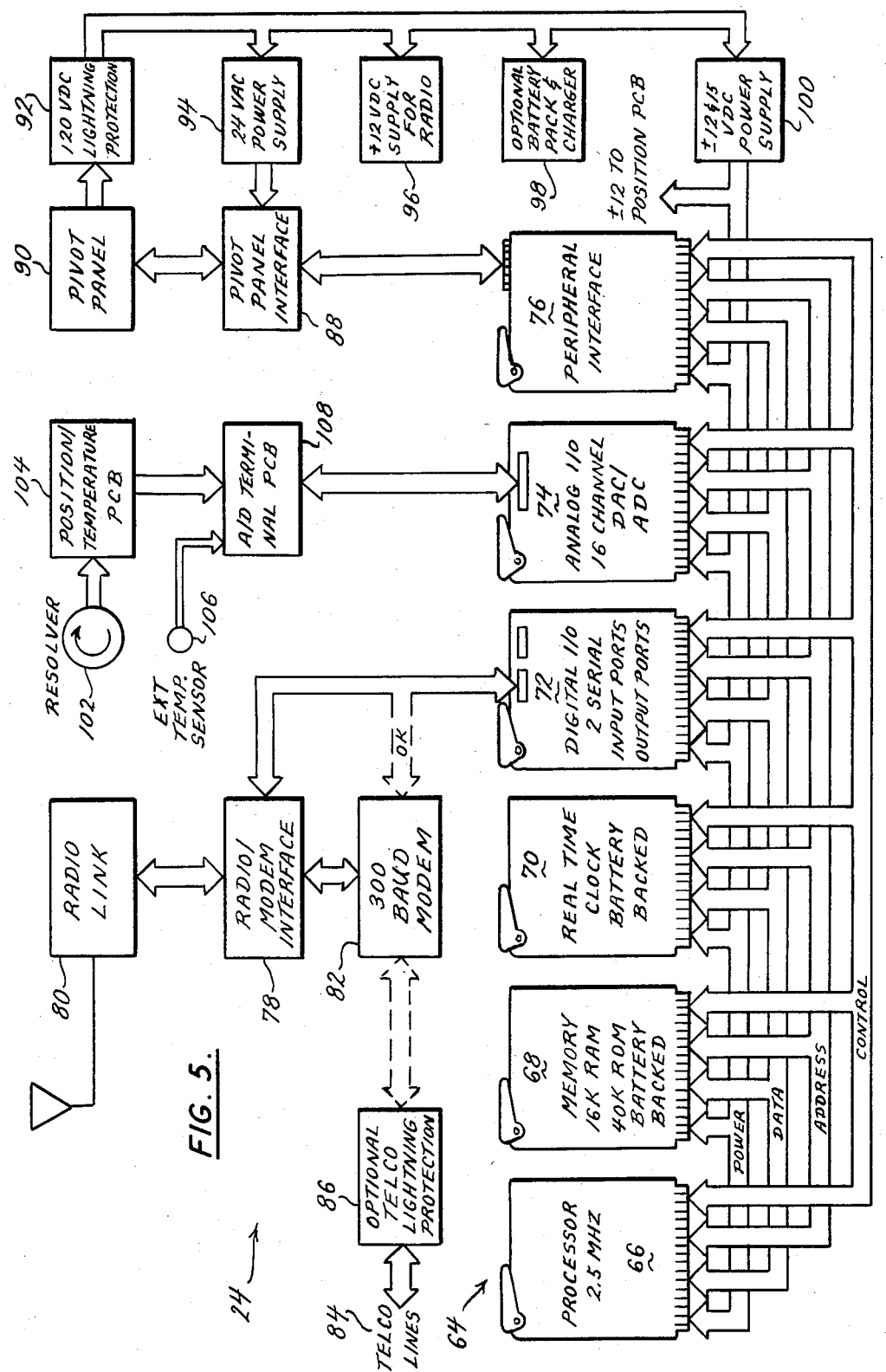

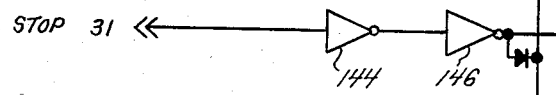
FIG. 9A.
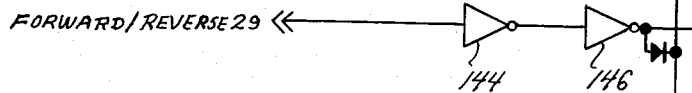
PERIPHERAL
INTERFACE TO
PROCESSOR
OF REMOTE
UNIT
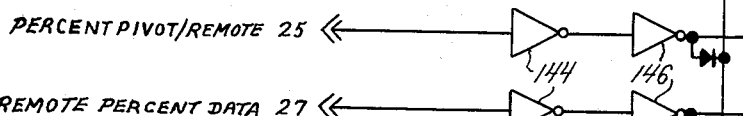
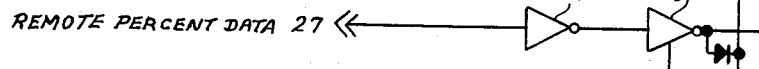
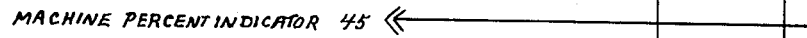
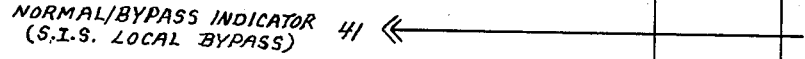
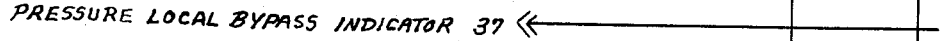

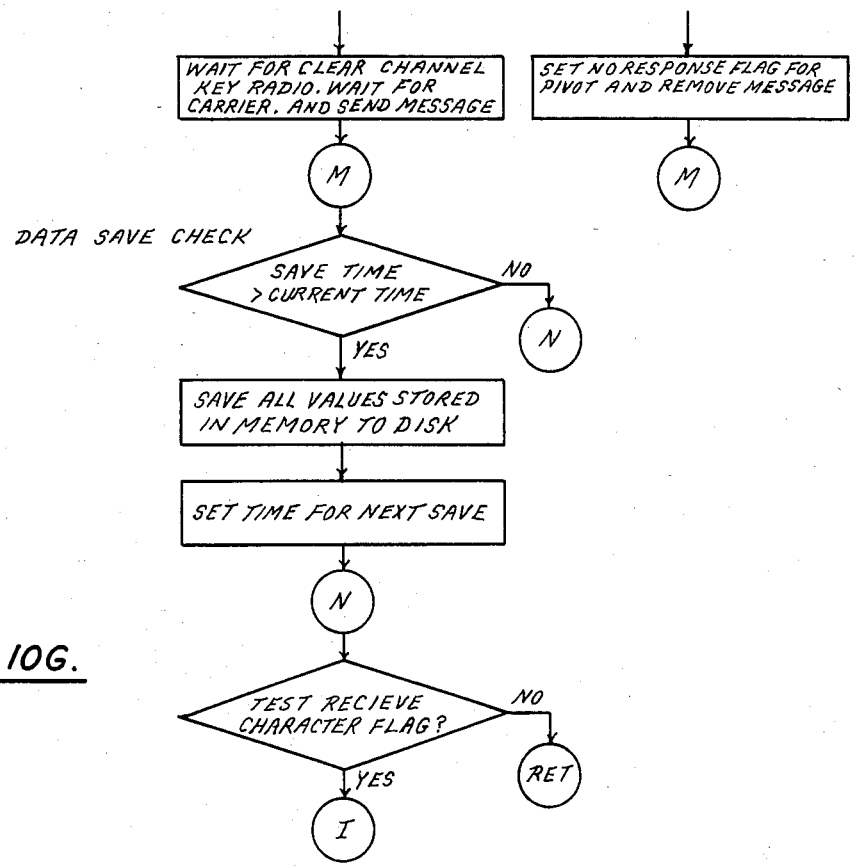
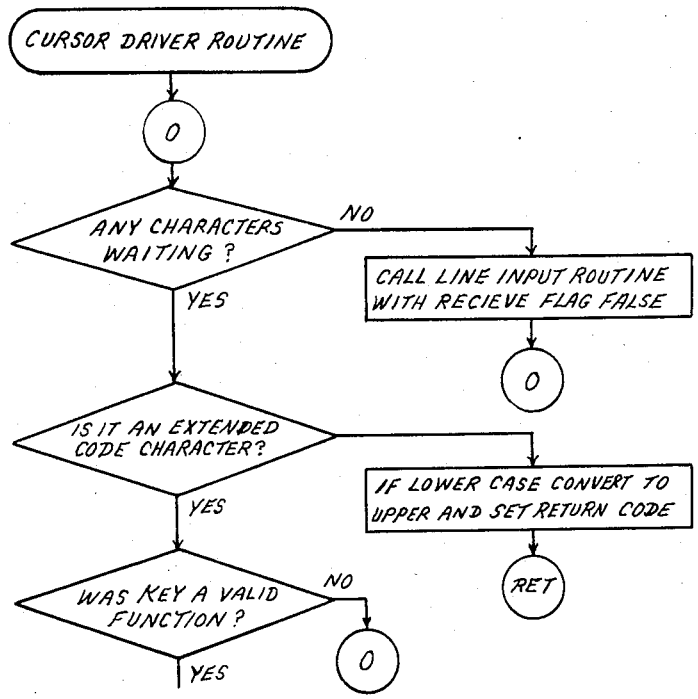
FIG. 10G.

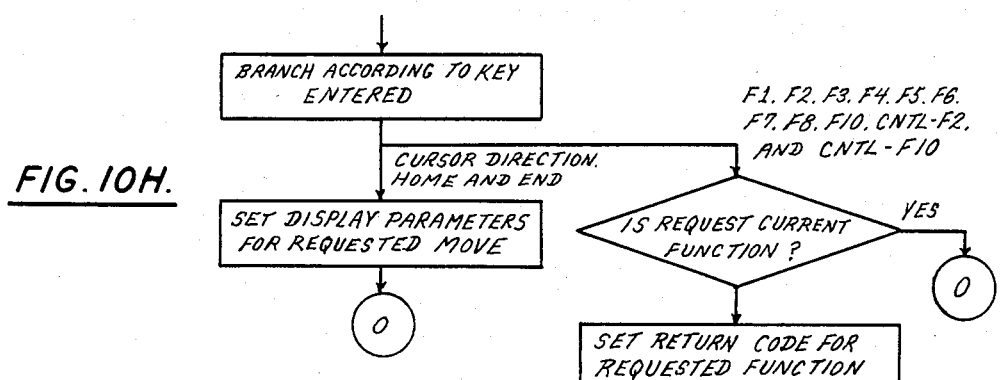
FIG. 10H.
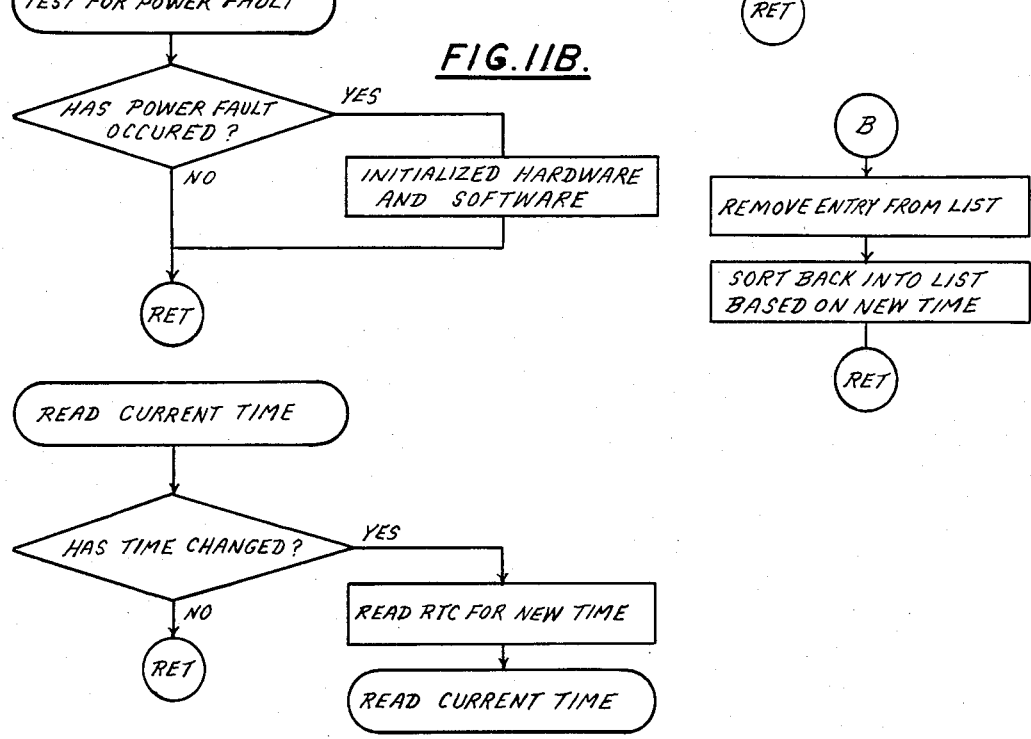
FIG. 11B.
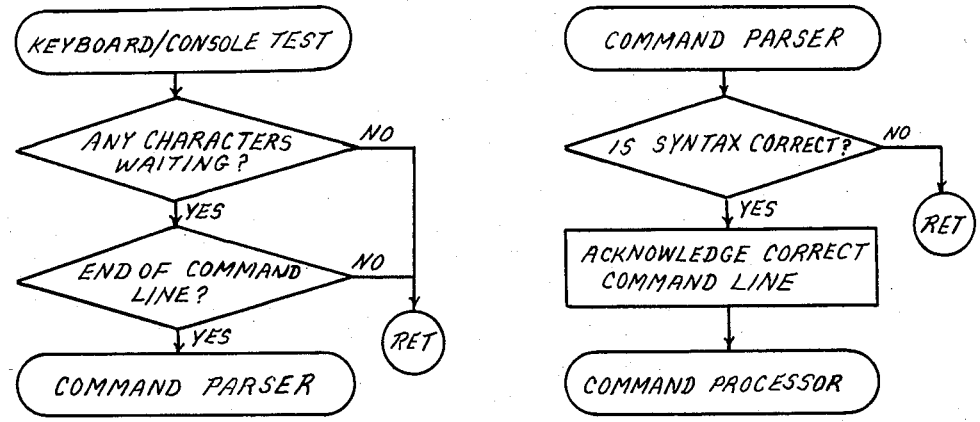

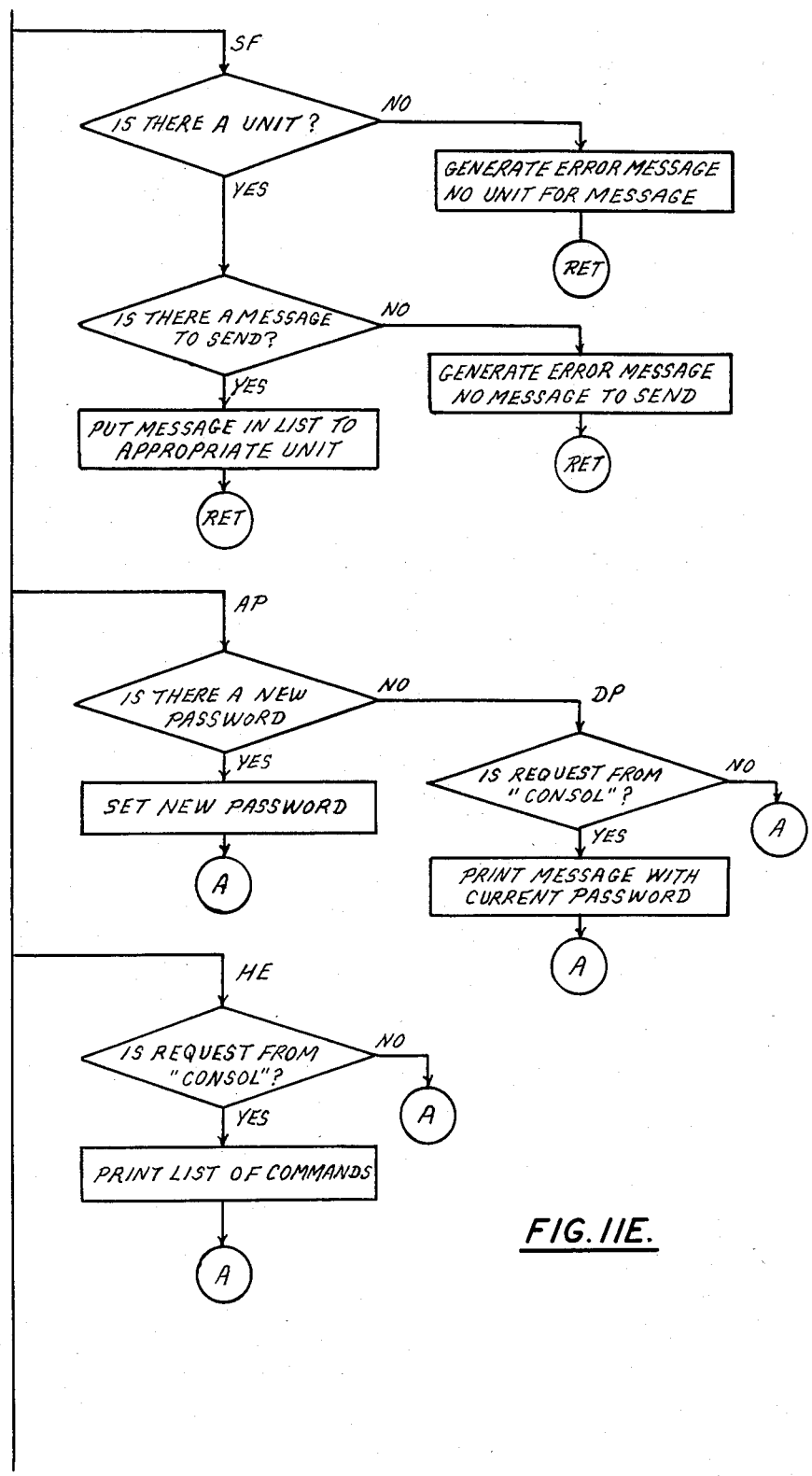
FIG. IIE.

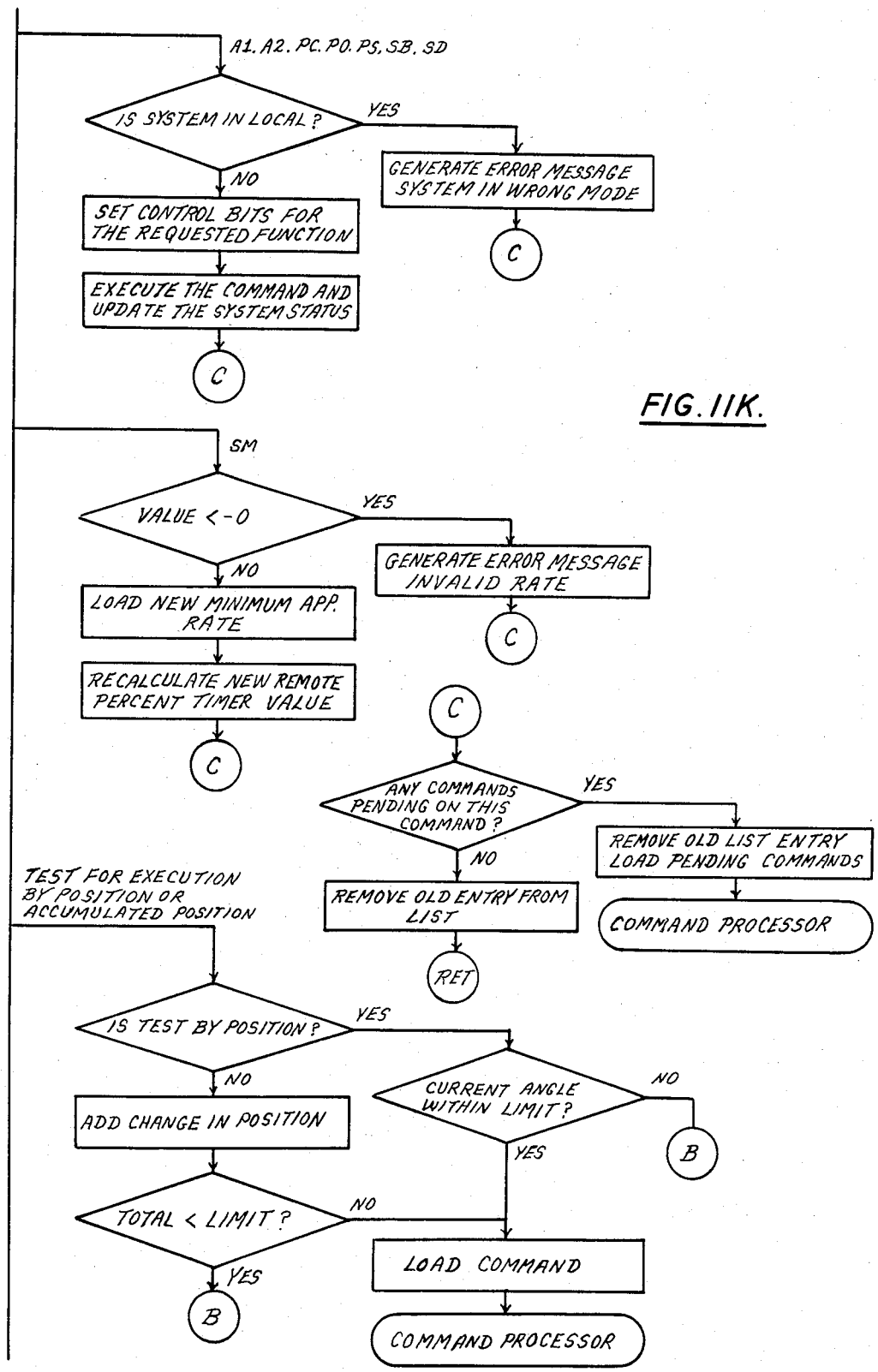

REMOTE COMPUTER CONTROL FOR IRRIGATION SYSTEMS

BACKGROUND AND SUMMARY OF THE INVENTION

Since the development of the computer, there are many electromechanical systems and devices which have been adapted for computer control. Typically, the computer includes a stored program and is interfaced with the electromechanical device through appropriate interface circuitry to monitor certain operating parameters and to control certain operating parameters of the device. Computers have been used to control single devices, and also to control a plurality of devices which might be spaced geographically.

With the advent of the microcomputer, and the dramatic decrease in cost and size, and the increase in flexibility and power, it has become feasible to automate and computerize many additional kinds of electromechanical devices. For example, computerized systems have been developed and are available in the prior art to control a number of irrigation systems, including center pivot irrigation systems, from a central base station, such as a farmer's house. A center pivot irrigation system generally comprises an elongated water pipeline with sprinklers spaced therealong with one end fixed at a central point about which the pipeline rotates, the sprinklers on the pipeline irrigating the land beneath it as the pipeline sweeps through a circular area. These elongated pipelines or center pivots can be as much as a quarter mile to a half mile long. Therefore, the distance between center pivot irrigation systems may be substantial as a farmer may own quite a number of these center pivot irrigation systems.

The computer based controls presently available in the prior art for center pivot irrigation systems are generally comprised of a central base station which contains a stored program which centrally controls the operation and monitoring of each of the center pivots linked to the base station. Typically, a communications link such as radio or telephone is provided to link the remote center pivot controls at the pivot points with the central computer. An interface and possibly some limited processing capability is provided at each remote location, but these remote processors typically follow the commands and timing determined by the central computer. This type of system can be thought of as a central master base station with slave units located at each pivot which follow the instructions of the master and which have no capability to independently operate the pivot.

At least one system in the prior art does provide a microcomputer in the remote control unit. However, as best understood, the microcomputer in the remote unit has as its principal task the handling of communications back and forth with the main base station, and the base station remains in full control of all of the functions of the remote unit and the center pivot irrigation system connected to it.

Although these systems in the prior art do provide central computer control of a number of geographically spaced irrigation systems, they do have some disadvantages. For example, if a pivot is to be turned on at some time in the future, typically the central computer stores that instruction and sends a command to turn the selected pivot on only at the time at which the turn-on is desired, and not at the time at which the instruction is entered to the computer. Therefore, if a turn-on time is requested for some time in the future, it is required that the computer be operational and the program be running at that time for the message to be transmitted and the control function to be achieved. This means that the farmer must be cognizant of these command times and ensure that the computer is operational and the program running at the time that these commands are to be executed.

Still another disadvantage is that for a large number of controlled irrigation systems, it may be required that more than just several of the systems be controlled at the same time, thereby resulting in delays in control for those systems near the end of the program execution. For example, a farmer with 100 center pivots may desire that 30 of them be turned on at about the same time. Under a central computer control, there can be an inordinate delay for the last ones of these 30 center pivots to be finally turned on. This results from the time lag required to communicate instructions between the central base station and the remote units. Typically, protocols would require some fixed amount of time to obtain a clear channel, transmit, acknowledge receipt of the transmission, and execute the instruction.

Still another disadvantage of the system of the prior art is that with central intelligence, the farmer is ultimately dependent upon the operation of a single computer. Although computers have become very reliable with increasing technology, it is not uncommon for failures to occur. With central intelligence, failure of the main computer shuts down the entire system resulting in manual control for all of the individual irrigation systems until the central computer is fixed. Should that happen, the farmer must manually control each of his irrigation systems through the pivot panel controls typically provided by manufacturers of irrigation systems which are highly reliable, but do not provide the programmable features inherent with computer control.

To solve these and other problems, and to provide a system with greatly enhanced reliability, flexibility, and ease of operation, the inventors herein have succeeded in developing a computer monitoring and control system which utilizes "intelligent remote units" at each irrigation system with a central computer for collecting and monitoring data transmitted from each of these intelligent remotes, and also having the capability of communicating desired instructions to these intelligent remotes for their processing and execution in accordance with the stored programs contained in each intelligent remote. This is a distributed logic or intelligence type of system in that each intelligent remote is a stand alone controller and can function fully independently of the base computer. To further enhance the versatility and flexibility of the system, the inventors have provided a system which permits a farmer to physically visit the remote unit, observe the operation of the irrigation system, enter any desired changes into the pivot panel with manual action, and then the system will indicate these changes back at the base station by generating an alarm message. Thus, a farmer may manually override the remote intelligent unit and enter changes directly as a result of having observed conditions at the location without having the system override his manual corrections.

At each pivot panel, a local/remote toggle switch is provided which can be used to disable the remote intelligent unit and prevent its control of the pivot panel and irrigation system.

By distributing the intelligence among the remote units, the system has freed itself from dependency upon the operation of the central computer. With the inventors' system as disclosed herein, should the central computer fail, each independent intelligent remote will continue to operate its associated center pivot irrigation system in accordance with the instructions stored therein. Still another advantage is that instructions requested by the base computer are immediately transmitted to the appropriate remote and stored in the remote's memory for execution at the designated time or other condition (either immediately or at some time in the future), the operator upon entering the instruction immediately knows whether the instruction has been transmitted and accepted by the remote unit and will hence be carried out. This eliminates the problems mentioned above with keeping the main computer operational to ensure execution of instructions at preselected times, and also concerns about the future operation of the computer to ensure future execution of present instructions. Additionally, instructions may be conditioned on other parameters for later execution.

In connection with the development of this system, the inventors herein have also succeeded in developing several related circuits which provide unique advantages over circuits in the prior art. An example of this is the resolver circuit which is used to determine the position of the center pivot at any point in its sweep through the field, and generate a voltage with a magnitude and sign directly indicating that position for use by the computer. These and other advantages of the overall system, and individual circuits are more fully shown and described in the drawings and detailed description of the preferred embodiment which follows.

A BRIEF DESCRIPTION OF THE DRAWINGS

FIG. 2 is a diagrammatic representation of an alternate configuration for the present invention showing a base unit and a succession of remote units beyond communication range of the base unit;

FIG. 3 is a diagrammatic representation of the use of telephone cable as a communications link;

FIG. 5 is a block diagram of a remote unit;

FIGS. 9a through 9e are an electrical schematic of the pivot panel interface board as used in the intelligent remote unit;

FIGS. 11a through 11l are the intelligent remote flow chart.

DETAILED DESCRIPTION OF THE PREFERRED EMBODIMENT

Figure 1:
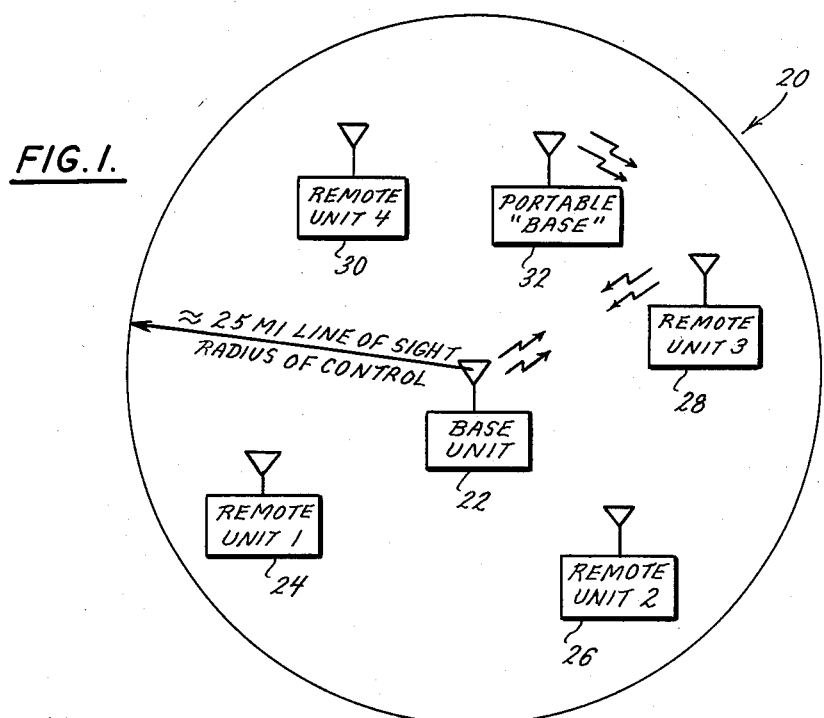
FIG. 1 is a diagrammatic representation of a base computer with four intelligent remotes and a portable base unit all within communication range of the main base unit.

The remote monitoring and control system 20 of the present invention is shown diagrammatically in FIGS. 1, 2 and 3. In FIG. 1, the system 20 is shown to include a central computer or base unit 22 with a plurality of intelligent remote units 24, 26, 28, 30; all of which are within communication range of the central computer or base unit 22. Alternately, a portable base unit 32 is shown which may be separately transported by the farmer and used to input and monitor the intelligent remote units. Additionally, a portable terminal (not shown) may be carried by the farmer to any intelligent remote unit and connected thereto which permits direct entry of desired instructions and monitoring of the associated irrigation system.

As shown in FIG. 2, the system 20 includes the same central computer or base unit 22 but remote unit 24 is at the edge of the communication distance for the base unit 22, a second intelligent remote unit 26 is at the edge of the communication distance for intelligent remote 24 and a third intelligent remote 28 is located at the edge of the communication distance for the intelligent remote 26. Of course, other intelligent remotes may be spaced anywhere between these shown in FIG. 2. The system 20 of the present invention provides a capability for transmission of data from the base unit 22 to the first remote unit 24, and then retransmission of the same data to remove unit 26, and then retransmission of the same data to remote unit 28; thereby significantly increasing the overall distance that a remote unit may be located from the base unit 22.

An alternative way to achieve communication between a base unit 22 and a remote unit 24 is shown in FIG. 3 and includes voice grade telephone lines 34 connected between appropriate switching circuits 36, 38, as known in the art. With this arrangement, there is virtually no limitation on the distance between the base unit 22 and a remote unit 24.

Figure 4:
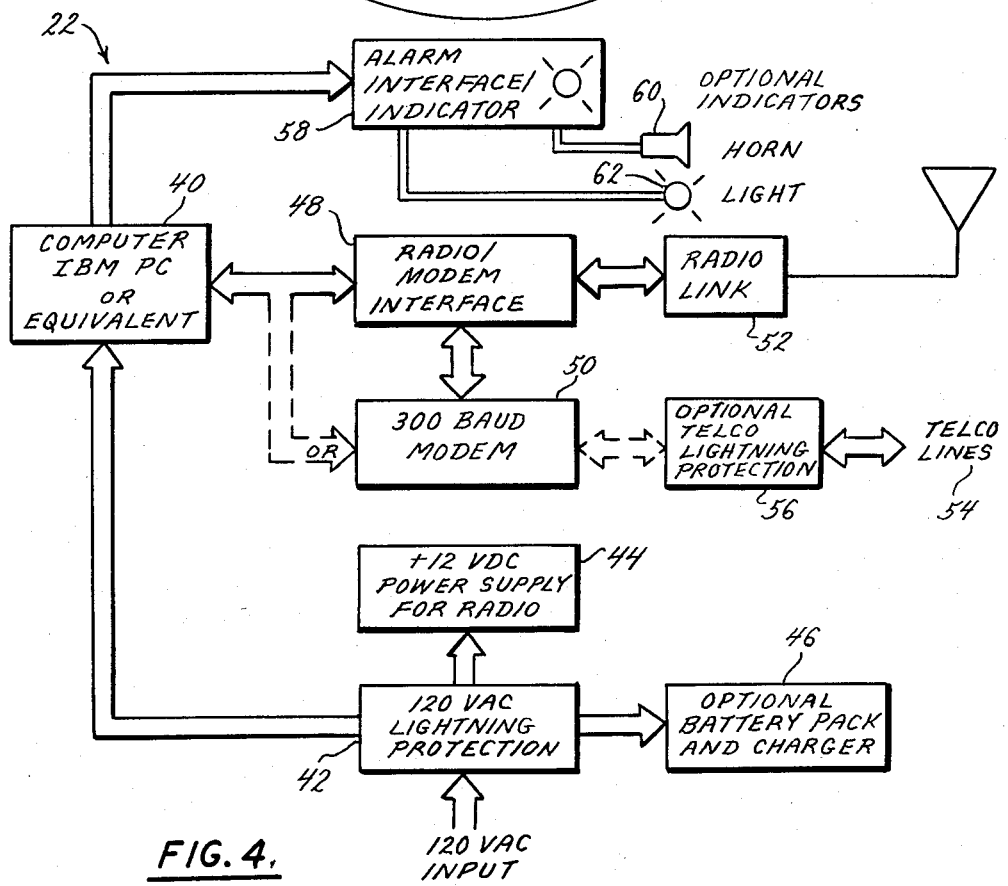
FIG. 4 is a block diagram of a base unit.

A block diagram of a base unit 22 is shown in FIG. 4 and includes at its heart a "personal computer" 40 such as an IBM PC or any other suitable device. It receives power from a suitable lightning protection circuit 42 which also provides power to a 12 volt D.C. power supply 44 and an optional battery pack and charger 46. The base station computer 40 is connected for communication with a radio/modem interface circuit 48 which in turn is connected to a modem 50 and a radio link 52, both of which are well known in the art. Alternatively to the radio link 52, the modem 50 may be connected to telephone company lines 54 through a lightning protection circuit 56, as shown by dashed lines. The base station computer 40 has outputs connected to an alarm interface indicator 58 which may drive suitable alarm indicators such as horn 60 and light 62.

Each intelligent remote unit, such as 24, is the same and has a block diagram as shown in FIG. 5. As shown therein, six PC boards comprise the central processor 64 and they are the microprocessor PC board 66, the memory PC board 68 containing 16k of RAM and 40k of ROM, a real time clock battery pack PC board 70, a digital I/O board for two serial ports on board 72, an analog I/O 16 channel board 74, and a peripheral interface PC board 76. These boards and this arrangement of boards are commercially available from ProLog and Mostek and is shown on page 1-1 of Pro-Log's Feb. 1983 STD Bus Technical Manual. As further shown in FIG. 5, the intelligent remote 24 includes a radio/modem interface board 78 connected between a radio link 80, a modem 82, and the central processor 64 through digital I/O board 72. An alternative means of communication is provided by telephone lines 84 through an optional lightning protection circuit 86 and modem 82 as shown by dashed lines. A pivot panel interface board 88 is connected to the peripheral interface PC board 76 of central processor 64 and provides the interface between the central processor 64 and the local control of pivot panel 90 which is a commercially available electromechanical control panel presently supplied by manufacturers of center pivot irrigation systems. Pivot panel 90 also provides A.C. power to the intelligent remote unit 24 through a suitable lightning protection circuit 92. These power supplies include a 24 volt A.C. power supply 94, a 12 volt D.C. supply for the radio 96, an optional battery pack and charger 98 for central processor 64 and a suitable power supply 100 for central processor 64. Also shown is a resolver 102 which detects the position of a center pivot irrigation system in the field and produces a signal indicative thereof to a position/temperature PC board 104. An external temperature sensor 106 produces a suitable signal and both 104 and 106 are connected to the A/D terminal PC board 108 for ease in connection to the analog I/O board 74.

FIGS. 4 and 5 disclose in block form the hardware configurations for both the base station 22 and a typical intelligent remote unit 24. While portions of these block diagrams are readily available from commercial sources, others represent circuits and devices which have been developed by the inventors herein. These are additionally shown in FIGS. 6-9, and are described as follows.

Figure 6:
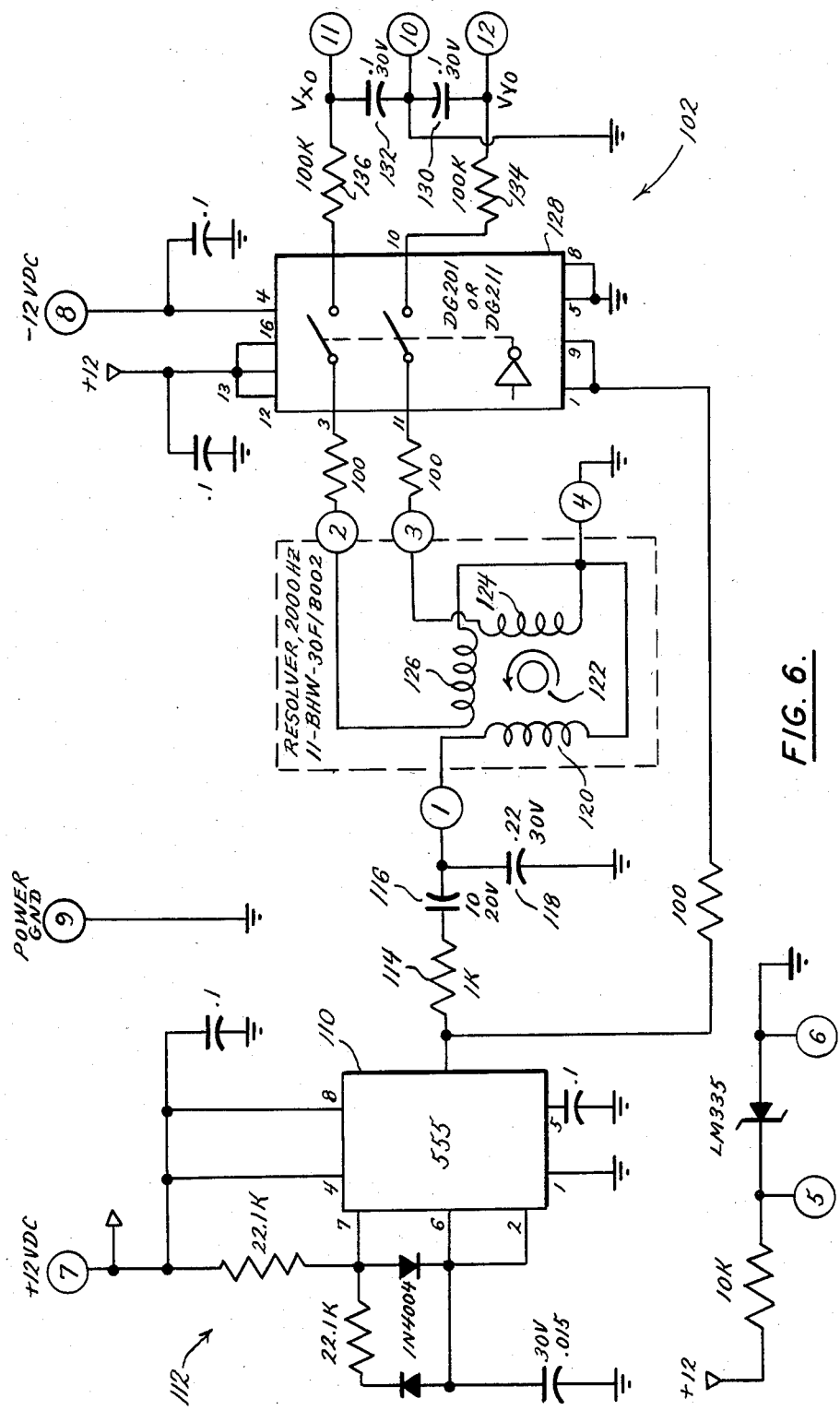
FIG. 6 is an electrical schematic of a resolver circuit used to generate a signal representative of the position of a center pivot irrigation unit in the field.

The resolver 102 is shown in greater detail in FIG. 6 and includes a 555 square wave oscillator 110 with appropriate biasing circuitry 112 to produce a 2000 Hertz square wave frequency at pin 3 of its output. From there, the square wave is fed through a current limit resistor 114, a D.C. blocking capacitor 116 and a filter capacitor 118 to resonate with coil 120. This produces a 2000 Hertz distorted sign wave across coil 120 which is either directly connected to the rotating rotor 122 or transformer coupled to another coil (not shown) mounted on the rotor. A pair of stator coils 124, 126 have their outputs connected to pins 3 and 2, respectively. As shown schematically in FIG. 6, coils 124, 126 are physically mounted at 90° to each other and produce an output voltage at pins 3 and 2, respectively, as induced by coil 120. The square wave output of oscillator 110 is used to trigger an electronic switch 128 and sample the output voltages from coils 124, 126 for a half cycle of each cycle. These output voltages are used to charge capacitors 130, 132 through resistors 134, 136.

The resolver circuit 102 operates as follows. The 2000 Hertz voltage impressed across rotor coil 120 induces a voltage in the stationary stator coils 124, 126 as the rotor 122 rotates and a center pivot system rotates through the field. The magnitude and polarity of the voltage induced in coils 124, 126 are directly related to the physical orientation of coil 120 with respect to each. For example, as coil 120 is perpendicular to either of those coils, then there is no induced voltage. As coil 120 becomes parallel with either coil, then maximum voltage is induced, with a polarity dependent upon the winding of the coil, and which ends of the coil are adjacent. Turning the rotor coil end for end will reverse the polarity of the induced voltage, as is well known in the art. The electronic switch 128 samples out only one-half cycle from each cycle of the induced voltage, and uses this voltage to charge capacitors 130, 132 through an R-C circuit, as shown. As the same output at pin 3 of oscillator 110 is used both to create the input voltage impressed across coil 120 and the trigger voltage used to trigger electronic switch 128, this resolver circuit 102 is frequency insensitive. Furthermore, as only one input voltage is used to induce a voltage in coils 124, 126 which are physically positioned 90° out of phase, the resolver circuit 102 is independent of the actual parameters of the input voltage impressed across coil 120, such as magnitude. As R-C circuits are used to charge capacitors 130, 132 with the output voltage, these output circuits do not provide for accurately following instantaneous movements of the rotor 122. However, as the resolver 122 is adapted for use with a center pivot system which may have a length of a quarter of a mile or more, it is more than accurate for the slow movements usually experienced in center pivot systems. Therefore, the resolver circuit 122 of the present design provides economies of cost and simplicity and yet still provides more than enough accuracy and speed of response to handle the particular application it is designed for.

Figure 7:
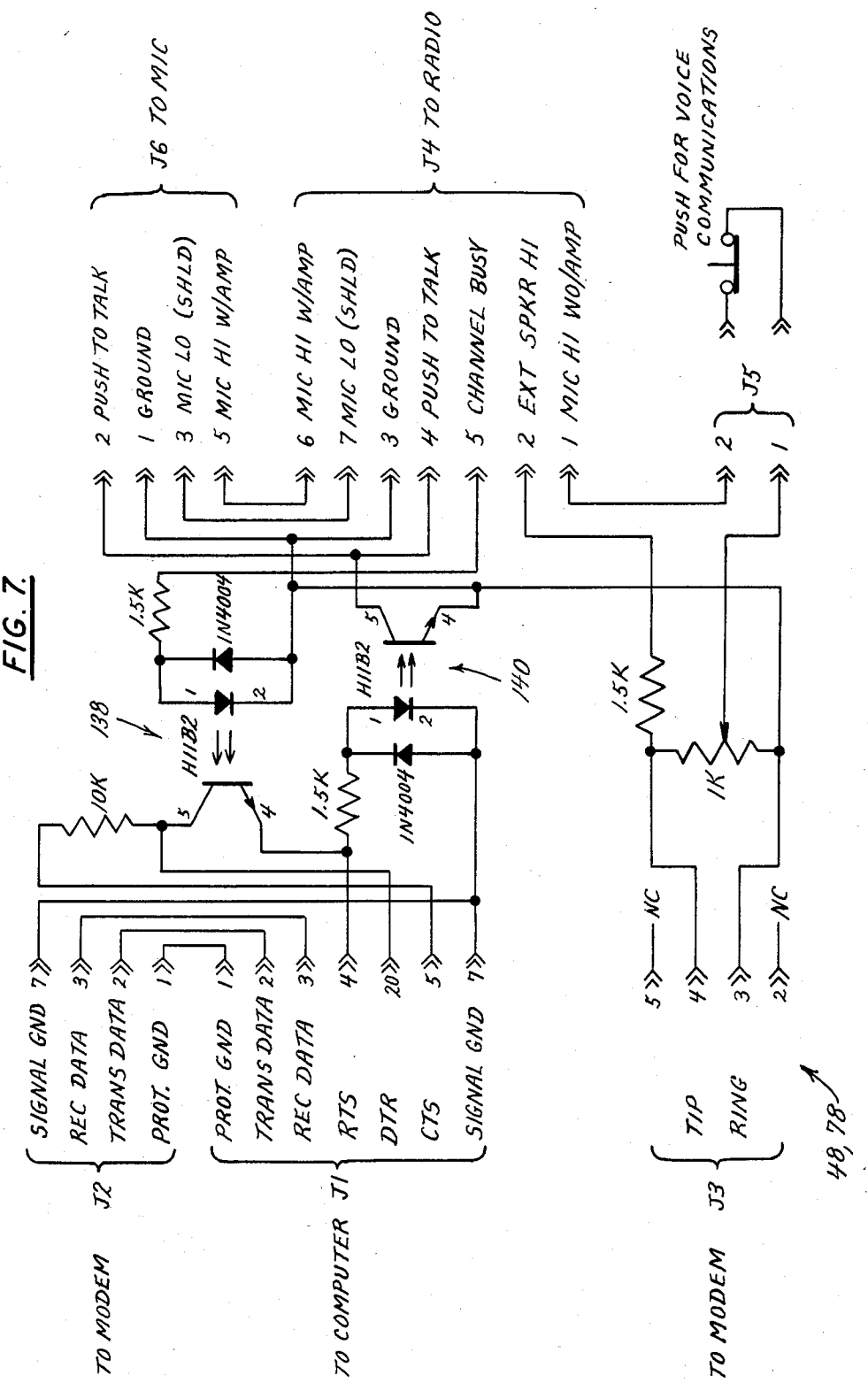
FIG. 7 is an electrical schematic of an interface circuit between the radio link, modem, and computer of either the base station or the intelligent remote unit.

FIG. 7 discloses in further detail the radio/modem interface circuit 48, 78 as used in both the base station 22 and remote units 24. It permits use of the RS 232 handshake routine, matches signal levels, and utilizes opto-isolators 138, 140 to isolate the computer from the radio. It is believed that this circuit may be easily understood by referring to the drawing.

Figure 8:
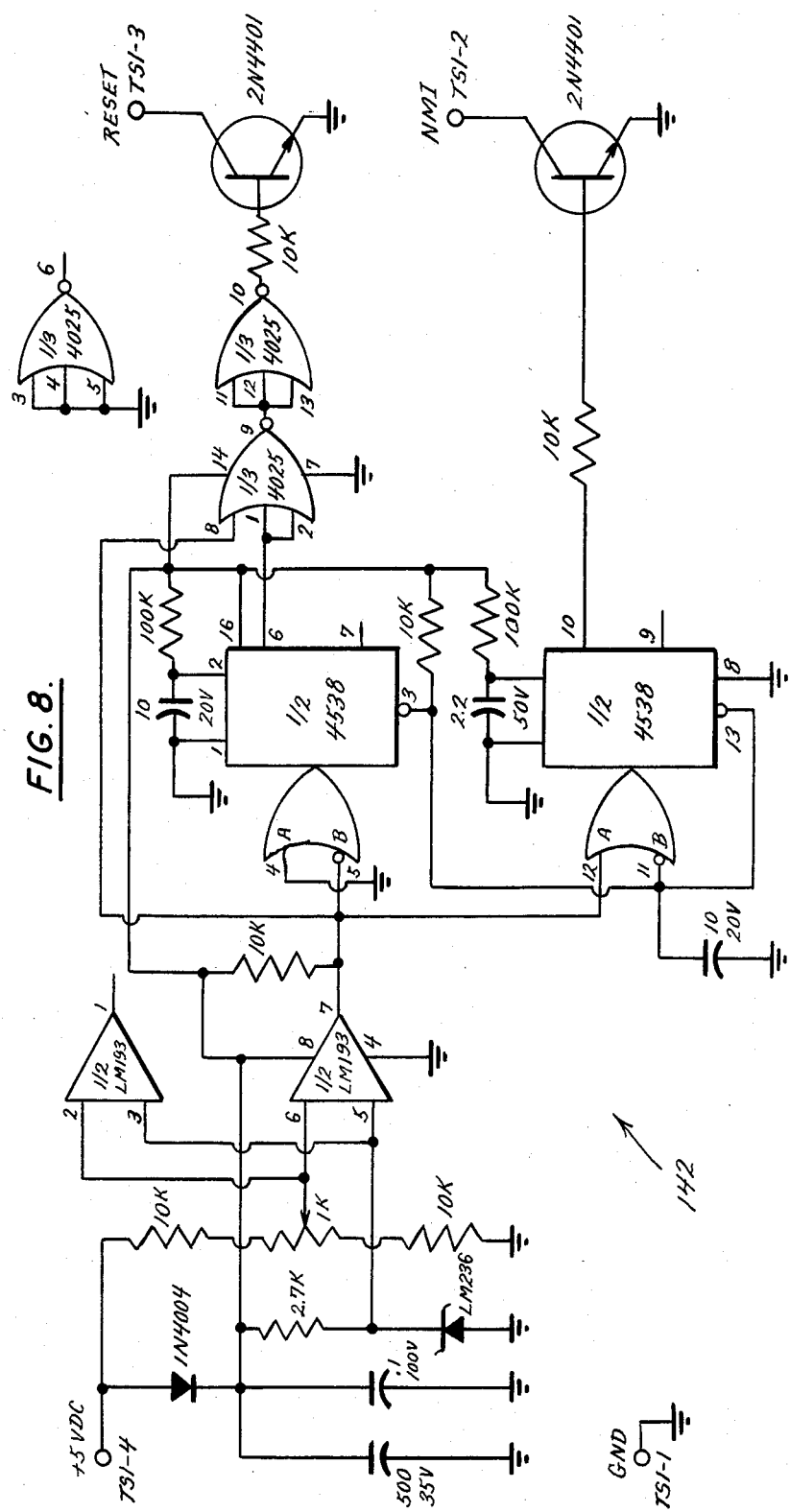
FIG. 8 is an electrical schematic of the power fail detect circuit.

A power fail detect circuit 142 is shown in FIG. 8 and is utilized to generate a non-maskable interrupt upon loss of 5 volts D.C. power to the computer in the remote unit, and to generate a reset signal upon restoration of power. It is believed that the operation of this circuit may be easily understood by referring to the figure, and type numbers indicated on the electronic packages shown therein.

Figure 9B:
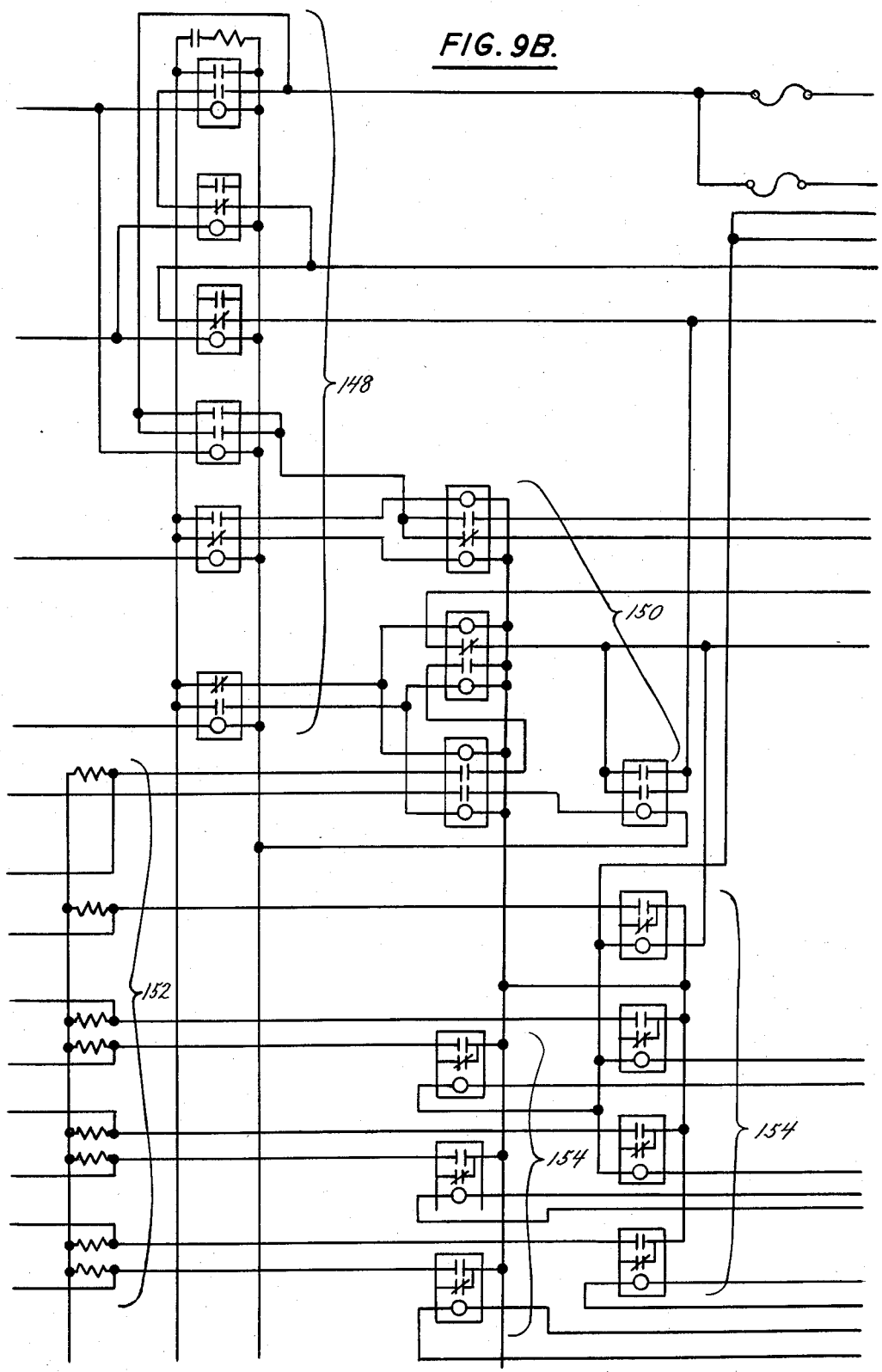
Figure 9C:
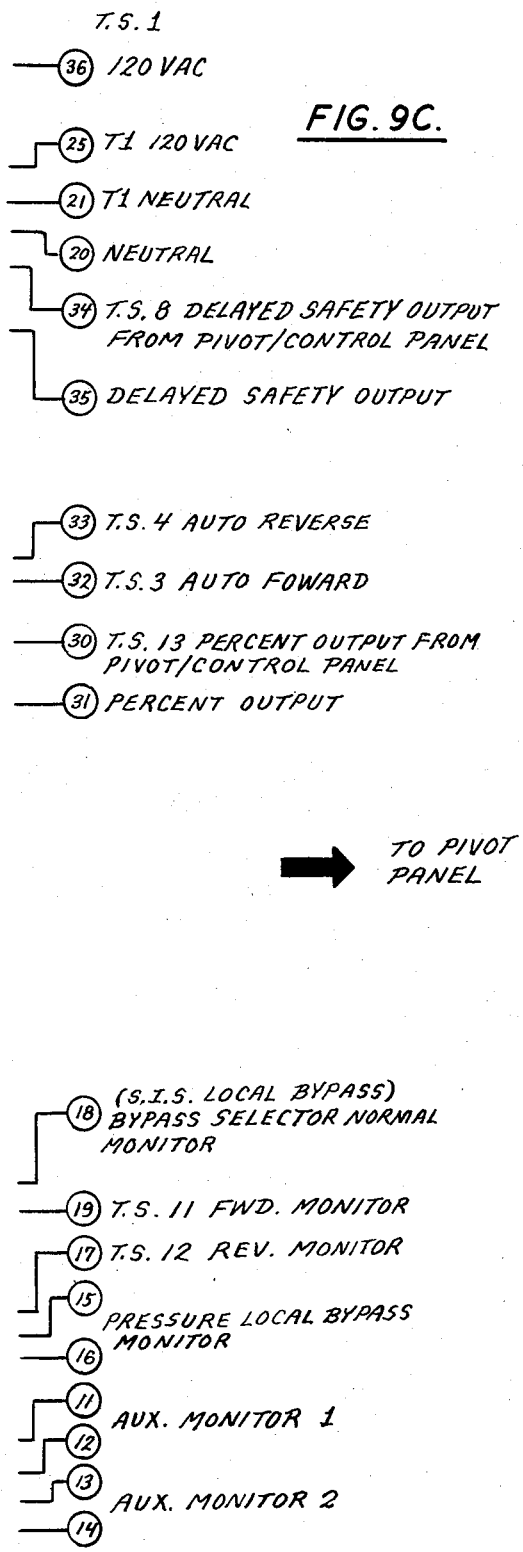
Figure 9D:
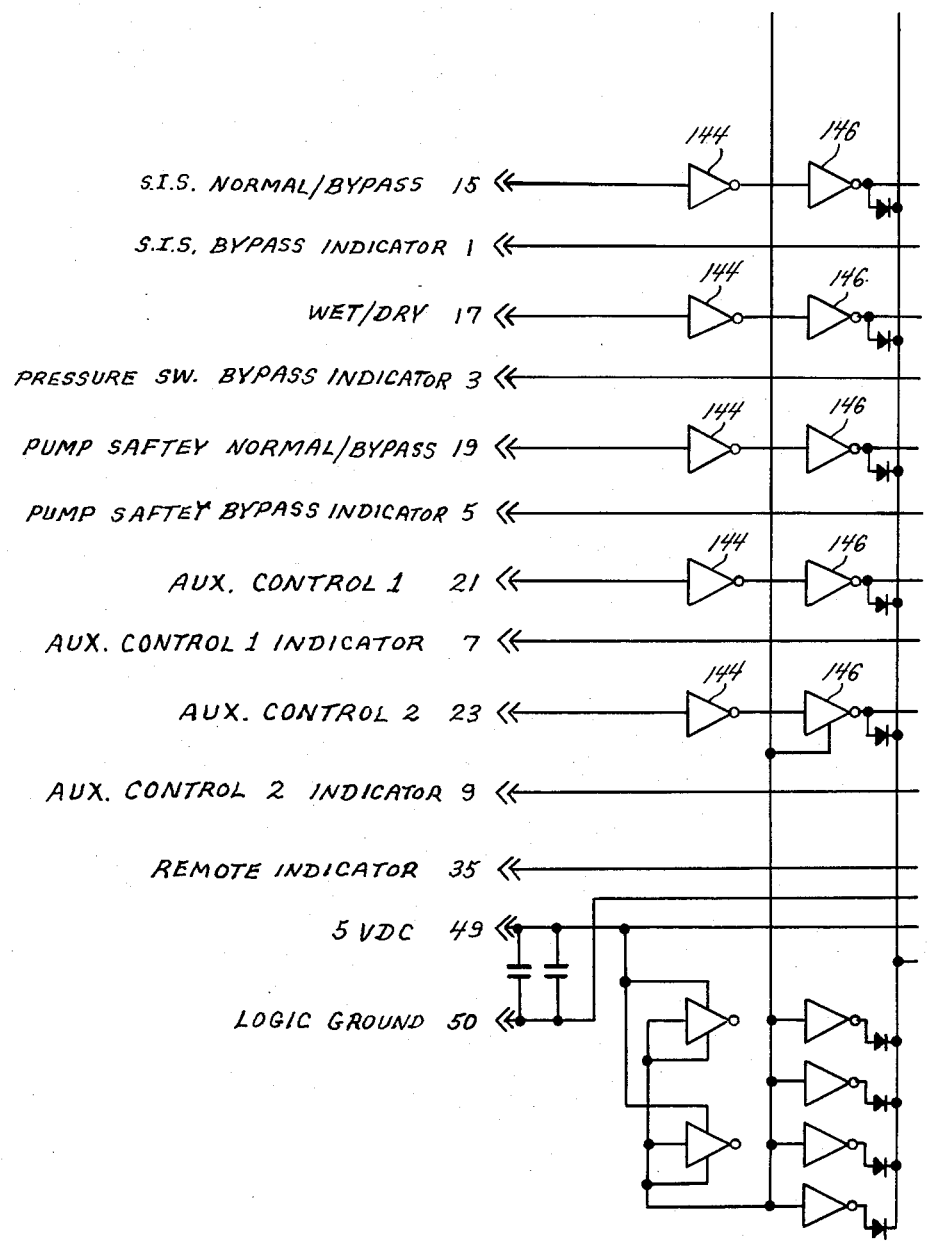
Figure 9E:
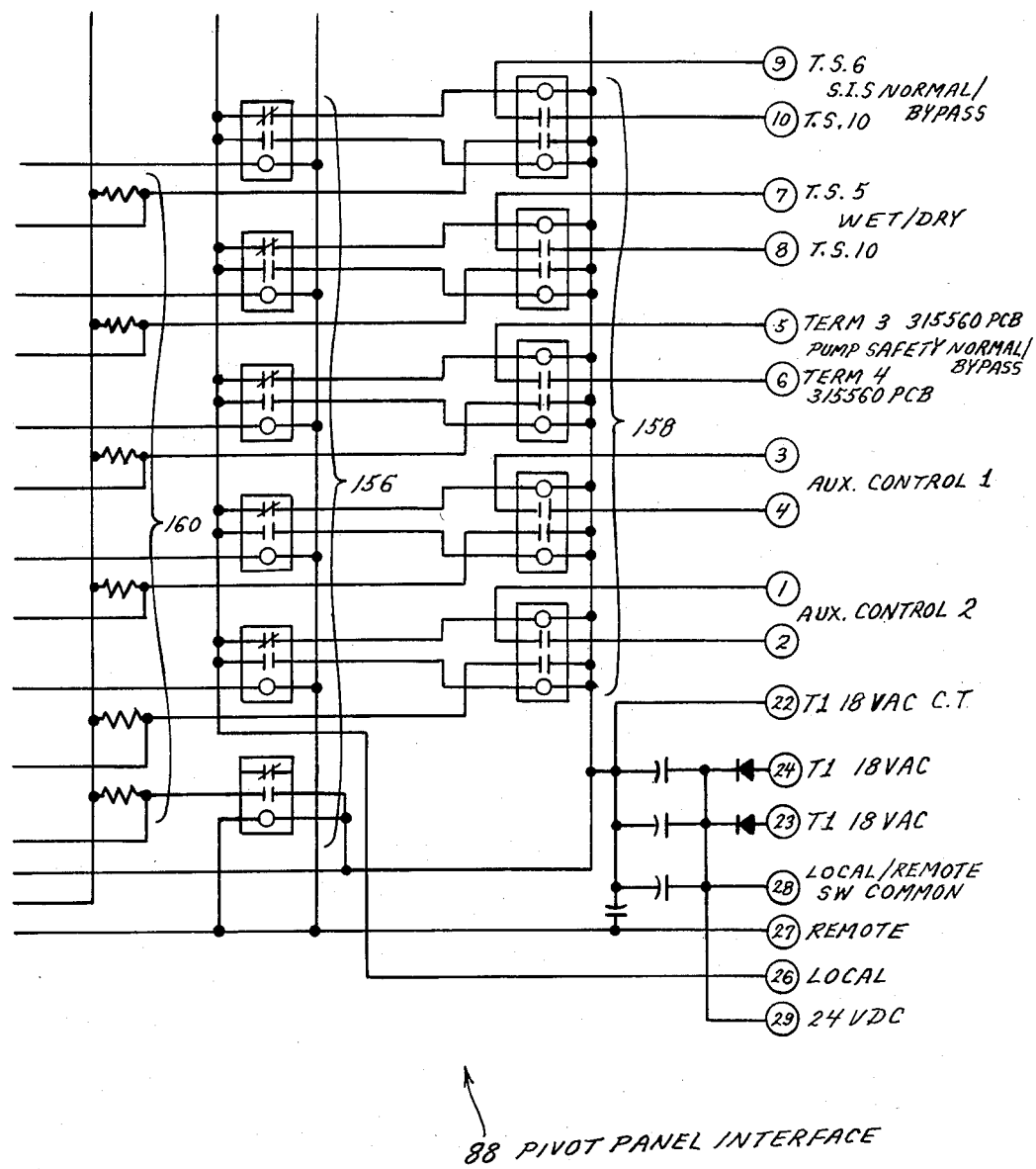

The pivot panel interface 88 is shown in greater detail in FIGS. 9a through 9e, with connections to the intelligent remote peripheral interface board 76 being indicated at the left side of FIGS. 9a and 9d, and connections to the local controller or pivot panel 90 being shown at the right side of FIGS. 9c and 9e. As shown at the lower right-hand portion of FIG. 9e, connections are provided for a remote/local single pole double throw switch to be connected between terminals labeled 26, 27, and 28. This switch is typically located at the pivot panel 90 and permits a farmer to select either local control, i.e. disabling of the intelligent remote unit or a remote control, allowing control by the intelligent remote unit 24. Each of the remote computer 24 outputs is easily identifiable by the pairs of driver amplifiers, 144, 146 associated with each output line. At the top of FIG. 9a, output lines are provided for start, stop, forward/reverse, percent pivot/remote, and remote percent data. These outputs are enabled by a first set of relays, collectively labeled 148 (see FIG. 9b), which are used to latch a second set of latch relays, collectively labeled 150. A plurality of resistors, collectively labeled 152, in combination with its associated relay contacts, provide an indication back to the computer 64 of the status of latch relays 150, and a second set of relays 154, the second set of relays 154 being under control of the pivot panel 90. Thus, resistors 152 provide a signal to the computer 64 of the actual operating condition in existence at the pivot panel 90. Still another set of relays 156 (see FIG. 9e) operate another set of latch relays 158 for a second set of outputs at the lower portion of FIG. 9d. Still another set of resistors 160, in combination with their associated relay contacts, provide an indication back to the computer 64 of the condition of latch relays 158, the condition of latch relays 158 being representative of the computer output condition, and the called for condition of the parameters of this second set of outputs. In operation, latch relays 150 and 158 are reset when the local/remote switch is switched to the local position. Upon return of the local/remote switch to the remote position, control is again returned of these latch relays 150, 158 to the computer 64. However, as can be seen in examining FIGS. 9a through 9c, these latch relays 150, 158 will not operate until computer 64 once again calls for their operation. However, the changed status of any operating condition will be concurrently reported back to computer 64 through the monitoring resistors 152, and the resetting of latch relays 158 will also be reported back to computer 64 through resistors 160. Therefore, the computer 64 will have an indication of both the actual status of the controls in the pivot panel 90 (and hence the center pivot system) as well as the status of the latch relays 158 which represent the operation of the system as called for by the computer 64 in the intelligent remote unit 24. Thus, the remote/local selector switch (not shown) when switched to the local mode effectively disables control of the pivot panel 90 from the intelligent remote computer 64, and resets all of the latched computer controlled relays 158. Upon switching of the remote/local switch back to remote, the intelligent remote computer 64 may be instructed to reinitiate any previous operating conditions, and any changes made in the pivot panel controls 90 will be reported back to the intelligent remote computer 64 through resistors 152.

Figure 10A:
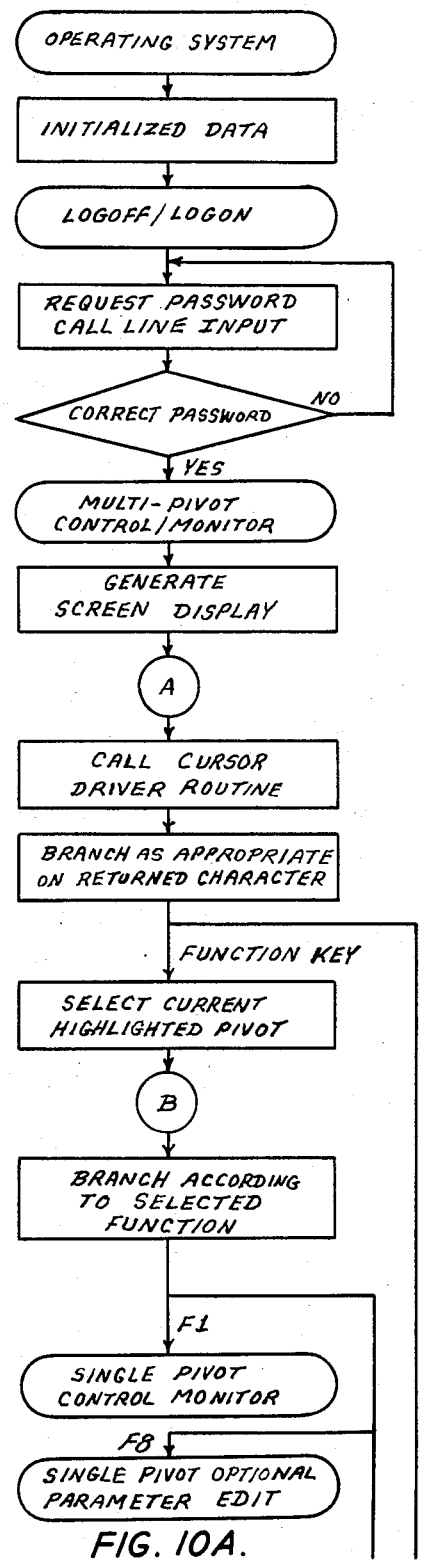
FIGS. 10a and 10h are the base station flow chart.

The flow chart for the stored program resident in the base station computer 40 is shown in FIGS. 10a through 10h and explains the operation of the base station computer 40. To aid in this explanation, representations of sample displays generated by the software are shown in the attached appendix, and will be referred to in describing the flow chart. These displays include sample data to further illustrate the capabilities of the system. Referring to FIG. 10a, the system begins by initializing data, and then a logoff/logon generates display 1 and requests a password to be entered by the operator to gain further access to the stored program. As shown in the appendix, a display is generated entitled "Multi-Pivot Monitor" and has several pairs of columns headed ID and Status. The ID number identifies a particular center pivot irrigation system and the Status column identifies whether the system is responding to base station interrogation or not (NR) and whether the system is on or off, and whether the system is in remote or local (L) control. After the correct password is entered by an operator, the stored program generates the display shown in the appendix entitled "Multi-Pivot Monitor" which has the same information as in the first display except that this time the operator is instructed at the bottom of the display to select one of several instructions. These alternative choices are shown in the software of FIGS. 10a through 10e. If the operator selects one of the function keys provided on the keyboard and labeled F1–F10, one of the selected subroutines is executed, as shown.

If the operator selects F1 for single pivot control/monitor, the display is generated and the subroutine labeled single pivot control/monitor is executed by the base station computer. As shown in the appendix, various parameters of the irrigation system are displayed, as well as the status of control parameters as instructed by the intelligent remote computer. Should the operator desire to change any of these controlled parameters, such as stop in slot, pressure, pump safety, or the other parameters controllable by the intelligent remote unit as shown in the pivot panel interface circuitry of FIGS. 9a through 9e, the operator can enter these changes and request immediate transmission of the desired instruction to the intelligent remote unit.

Figure 10B:
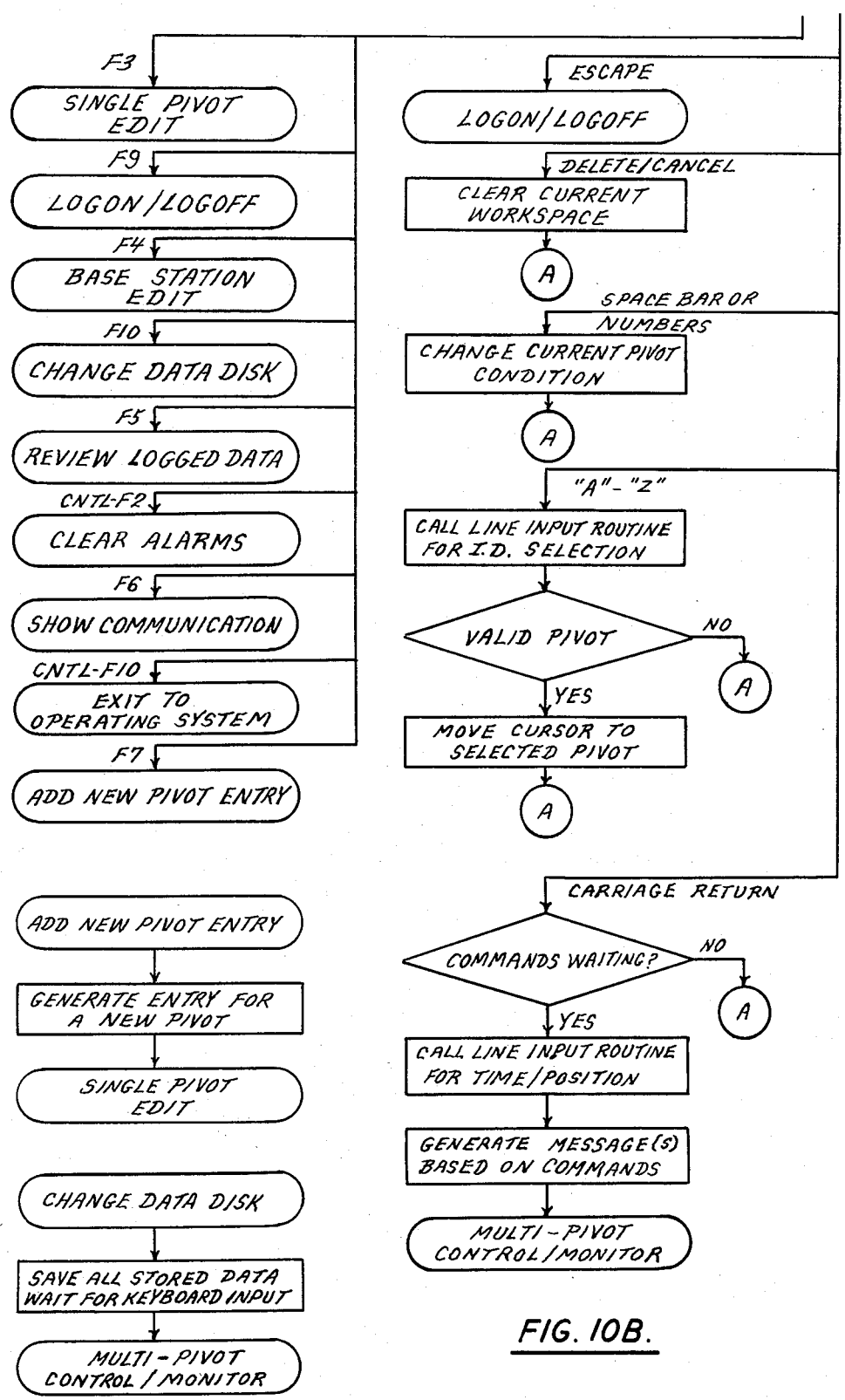
Figure 10C:
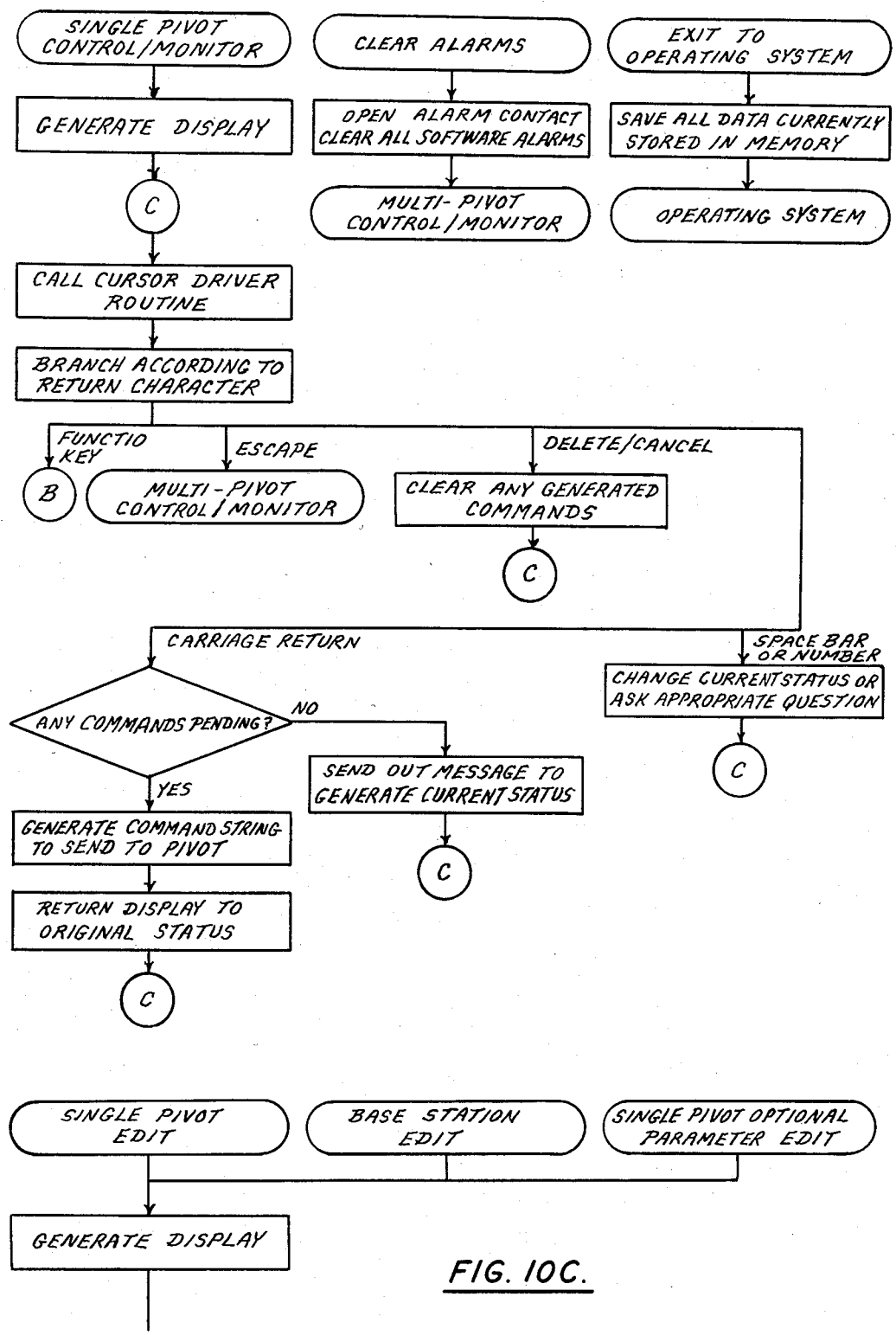
Figure 10D:
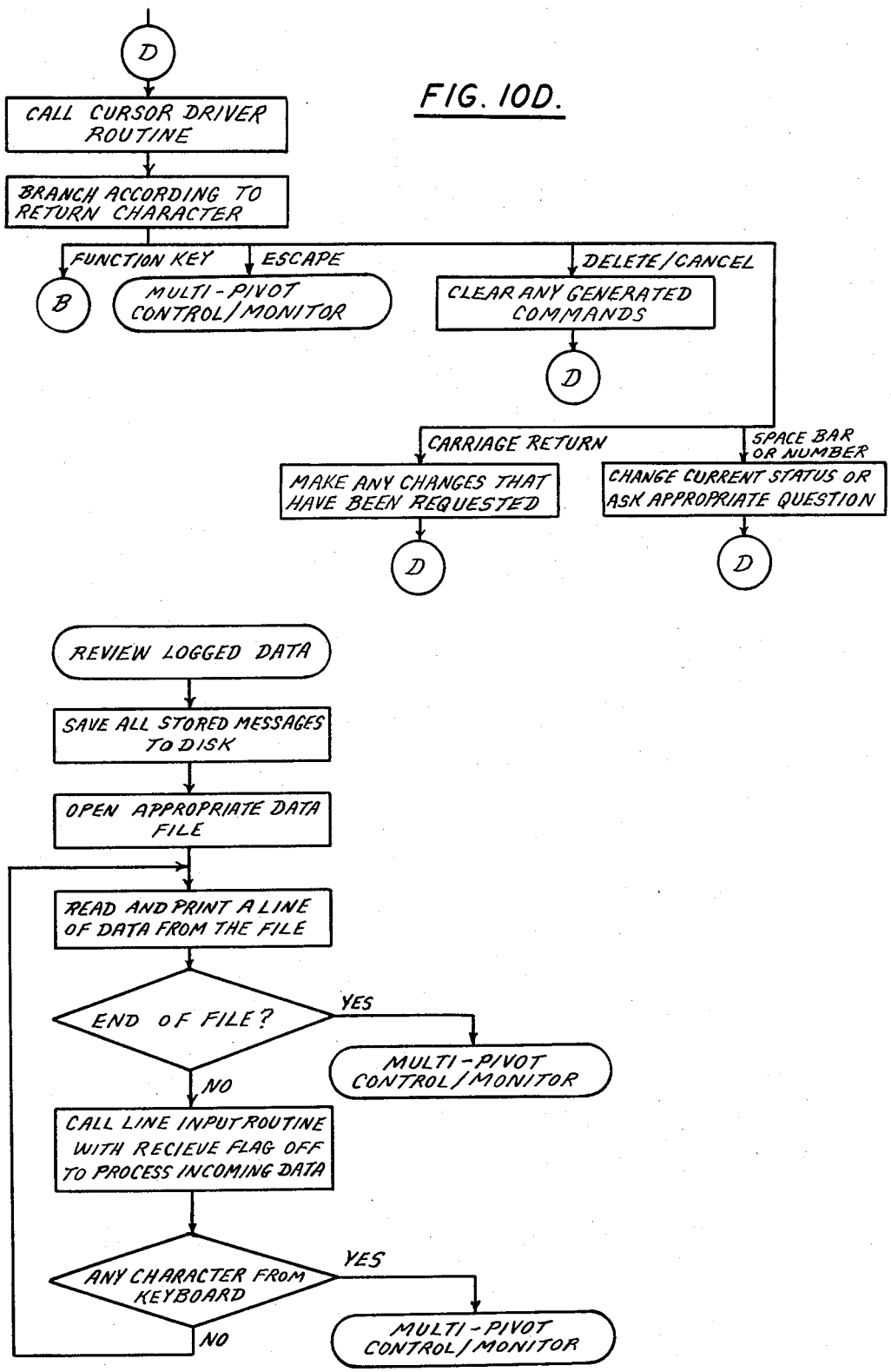
Figure 10E:
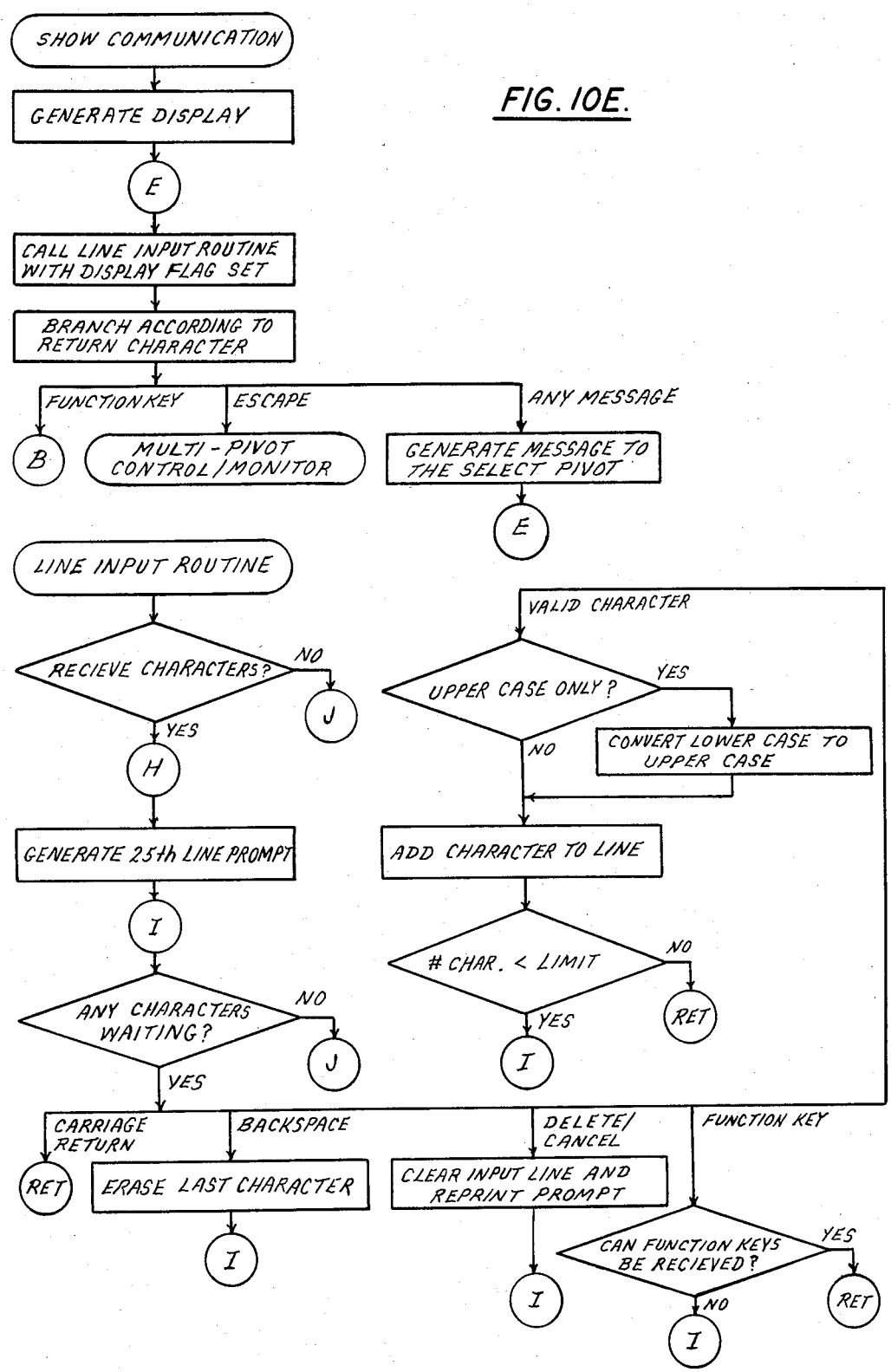
Figure 10F:
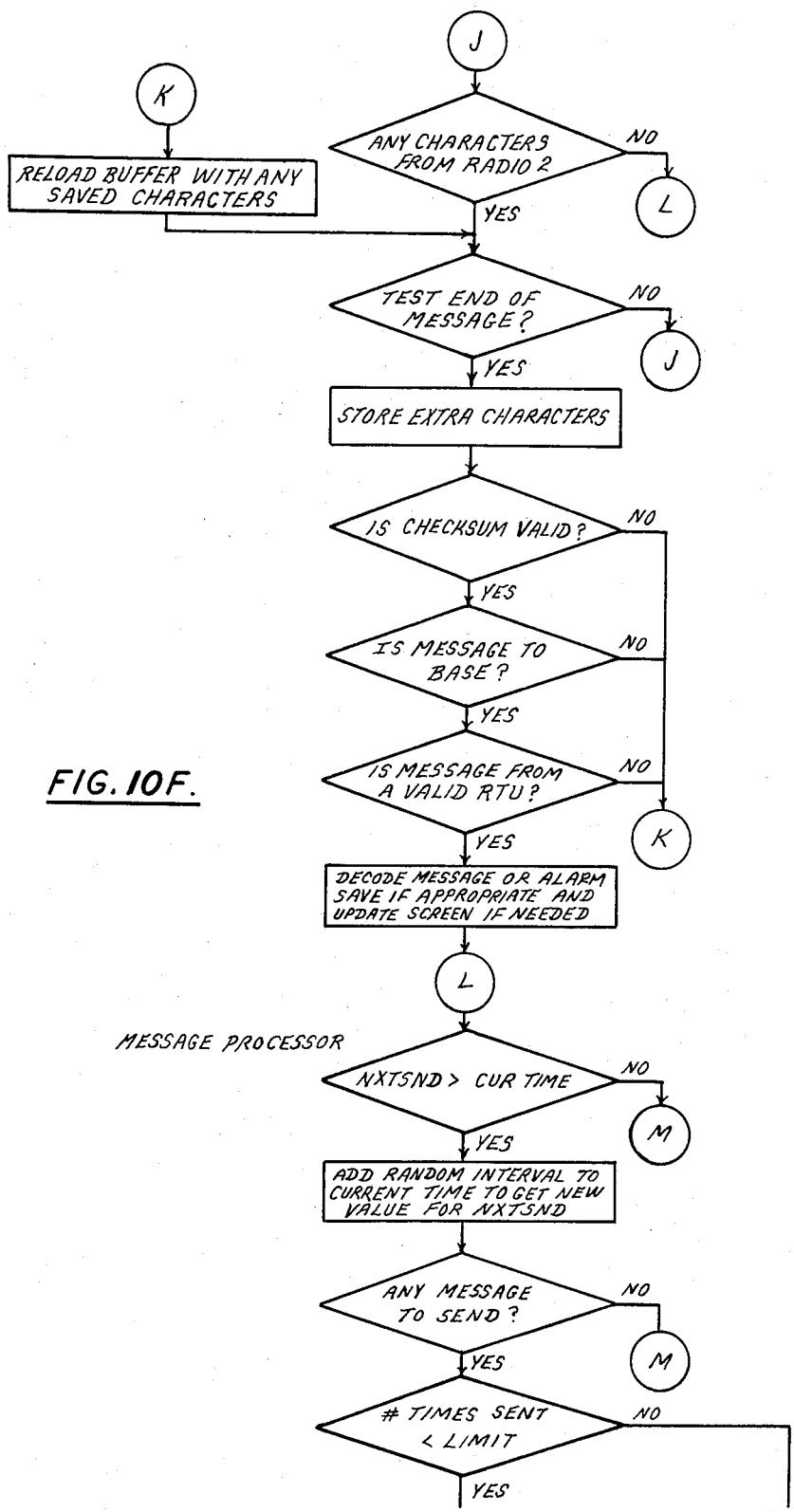

Should the operator select F3, then the software will generate the display of the appendix entitled "Edit Pivot Data Display", and will execute the subroutine identified as single pivot edit, as shown in FIGS. 10c and 10d. As shown in the appendix, instructions and parameter values determined by the remote computer are listed, and the operator can change any of these and request the desired instruction to be transmitted to the intelligent remote unit.

Should the operator select F4, then the display in the appendix is generated entitled "Base Station Edit", and the same subroutine is executed as for F3. As shown in the appendix, the display lists the current value of information selected by the operator for the base station, including the password, the time between writing data to storage on the disk, the number of times the radio link is to attempt to send a message to an intelligent remote unit, etc. as shown therein. As before, the operator can initiate changes but these will be executed immediately as the base station computer is the computer being operated by the operator.

Should the operator select F5, then information similar to that shown in the appendix will be generated, this information representing the reported messages received from the intelligent remote units, messages transmitted to the intelligent remote units, and such other information as is desired to be stored therein, depending upon the particulars of the software.

Should the operator select F6, then the machine will execute the show communication routine and will display communications to or from the base station from a remote unit.

Should the operator select F7, then a display similar to the display of the appendix entitled "Edit Pivot Data Display" will be generated to permit the entry of a new pivot to the system.

Should the operator select F8, then the display in the appendix entitled "TEST01 Optional Parameter Display" will be generated, and the associated subroutine will be executed permitting the operator to edit the various optional parameters for monitoring or display.

Selecting F9 will return the operator to the display of the appendix, selecting F10 will instruct the computer to write all data stored in active memory to disk and prepare the machine for the changing of the diskette on which data is regularly stored, selecting Control F2 will clear the alarms generated by the intelligent remote units and flashing on the various displays previously described, and selecting Control F10 will terminate execution of this program.

The line input routine is referred to in the portion of the software previously described, and essentially handles the receipt of data from the intelligent remote units, processes the messages comprising the desired instructions to be transmitted and transmits those instructions to the appropriate intelligent remote unit, and saves the data by storing it to disk at an appropriate time interval. The cursor driver routine also shown represents the manner in which the cursor is controlled.

From the above description, it should be apparent that the stored program for the base station permits an operator to control information received from intelligent remotes, and to generate and transmit desired instructions for execution by the intelligent remotes to control their associated irrigation system. The stored program resident in the intelligent remote units is completely separate and different from that described above in connection with the base station.

Figure 11A:
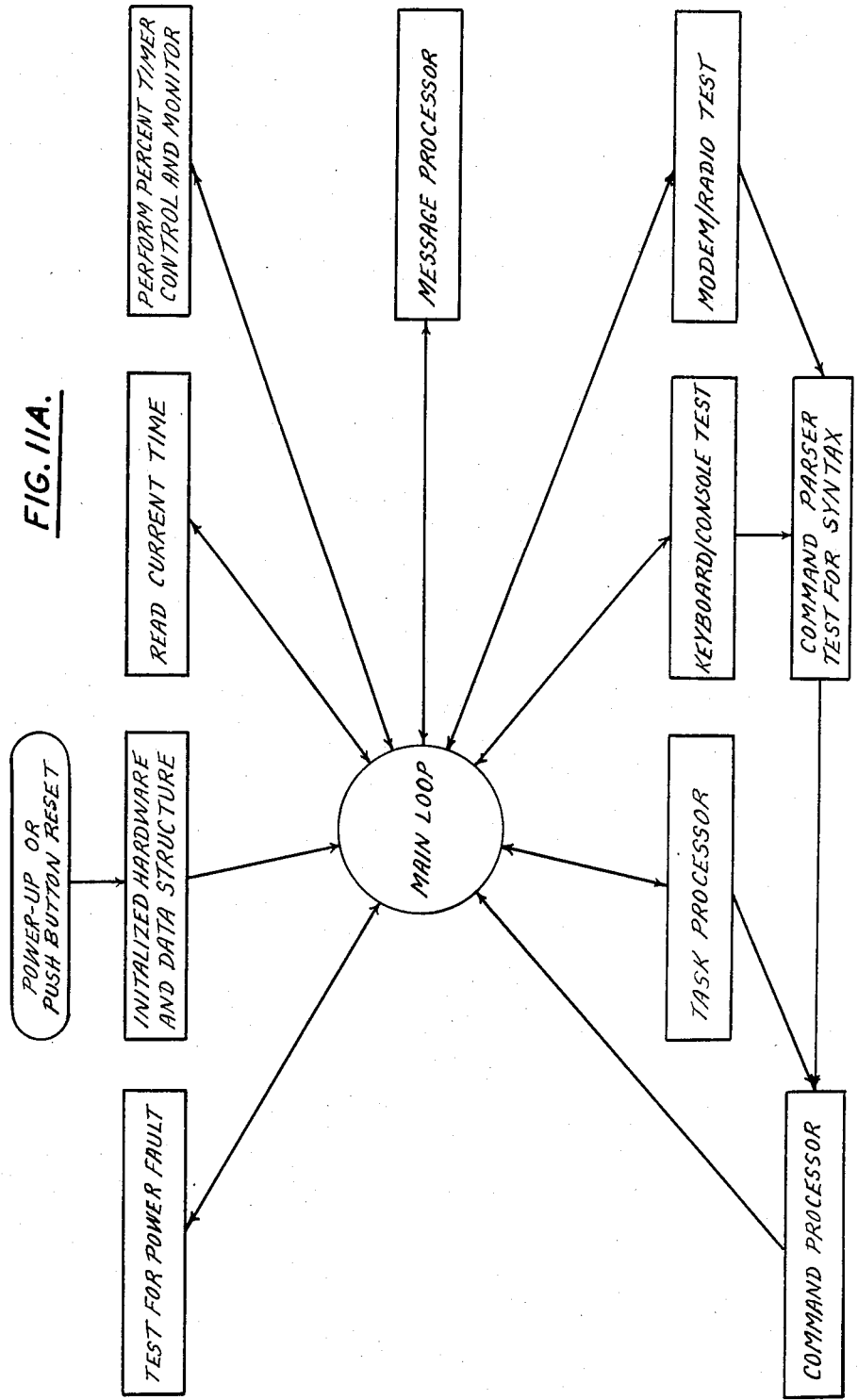
Figure 11C:
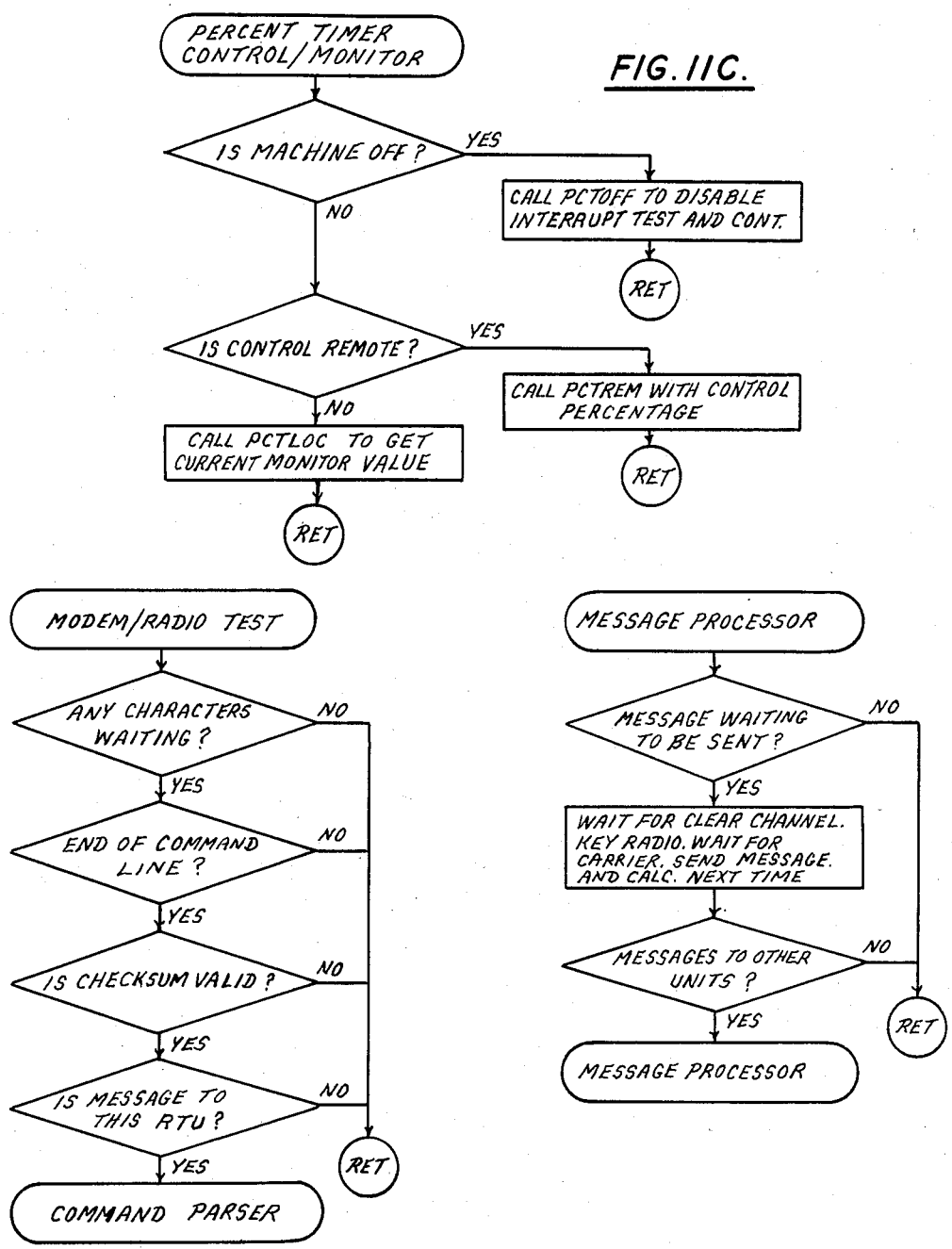
Figure 11D:
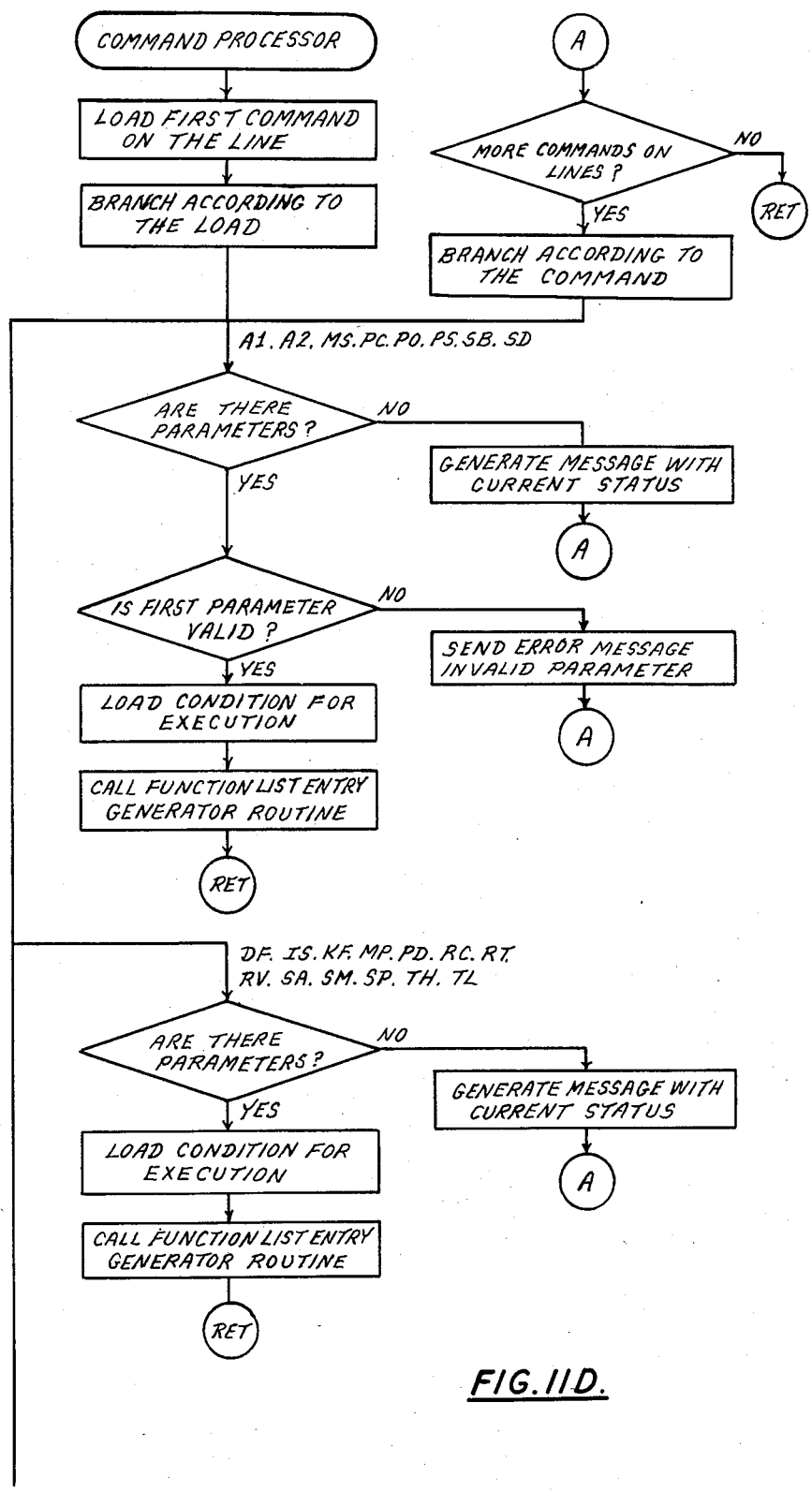
Figure 11F:
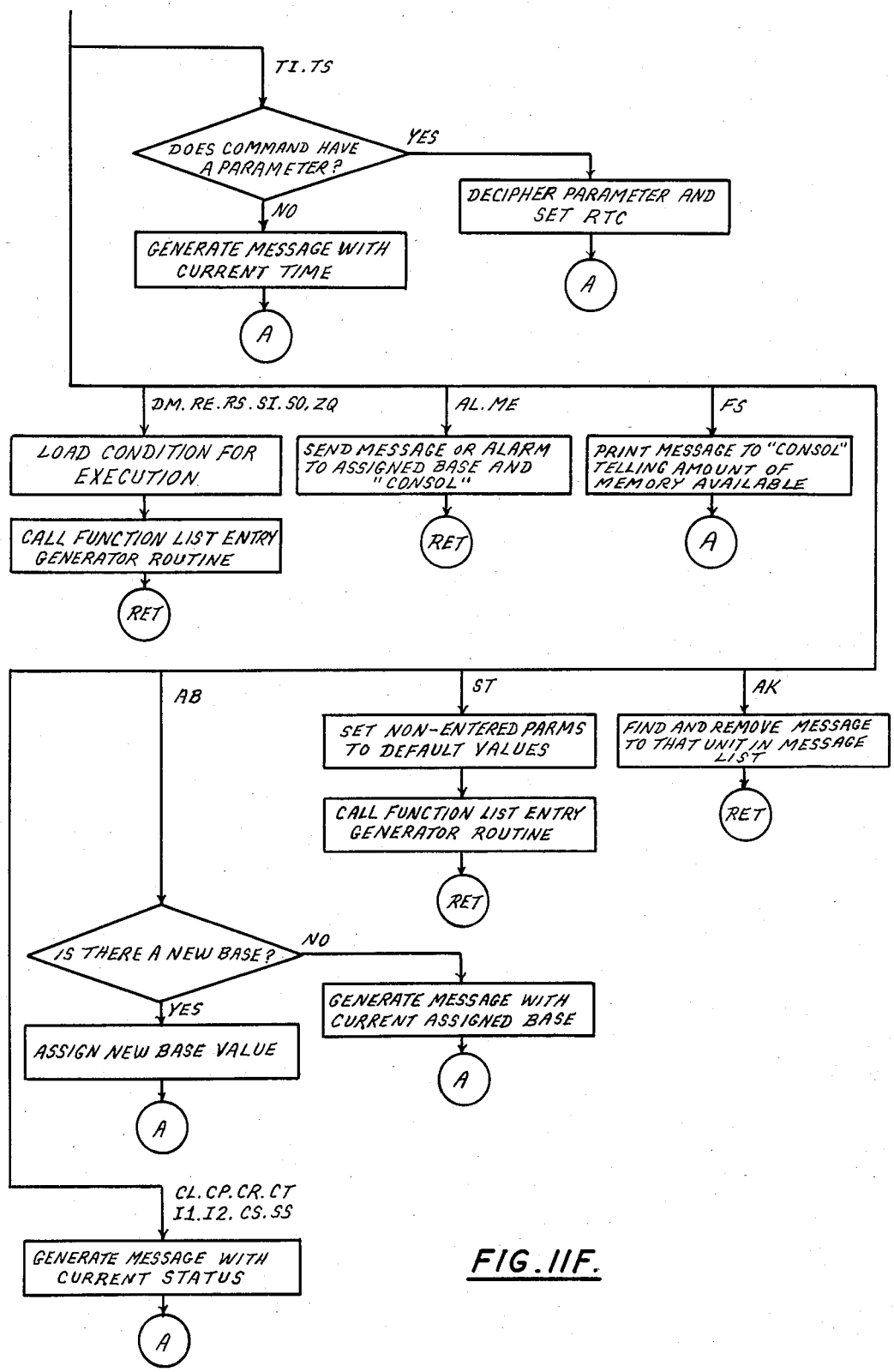
Figure 11G:
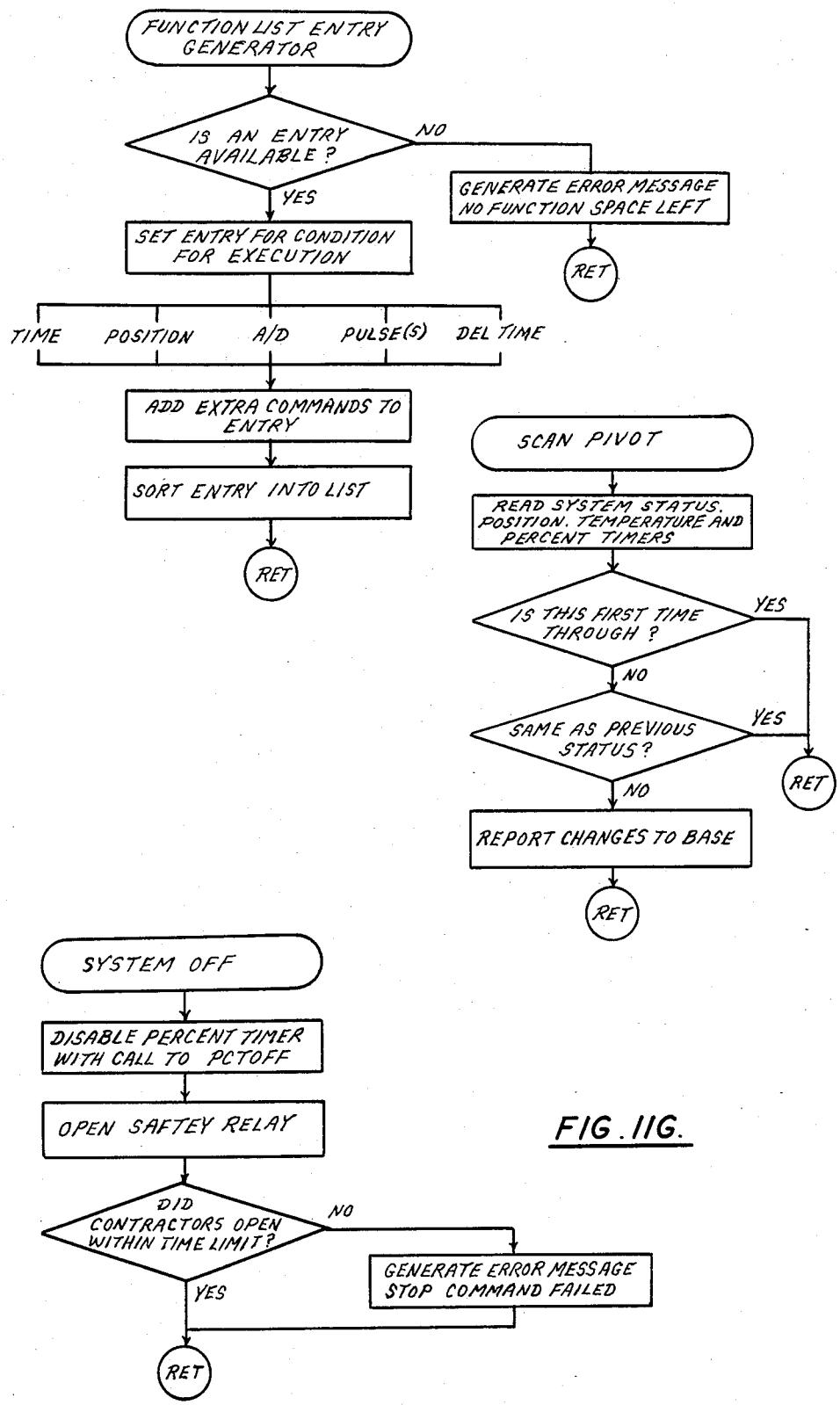
Figure 11H:
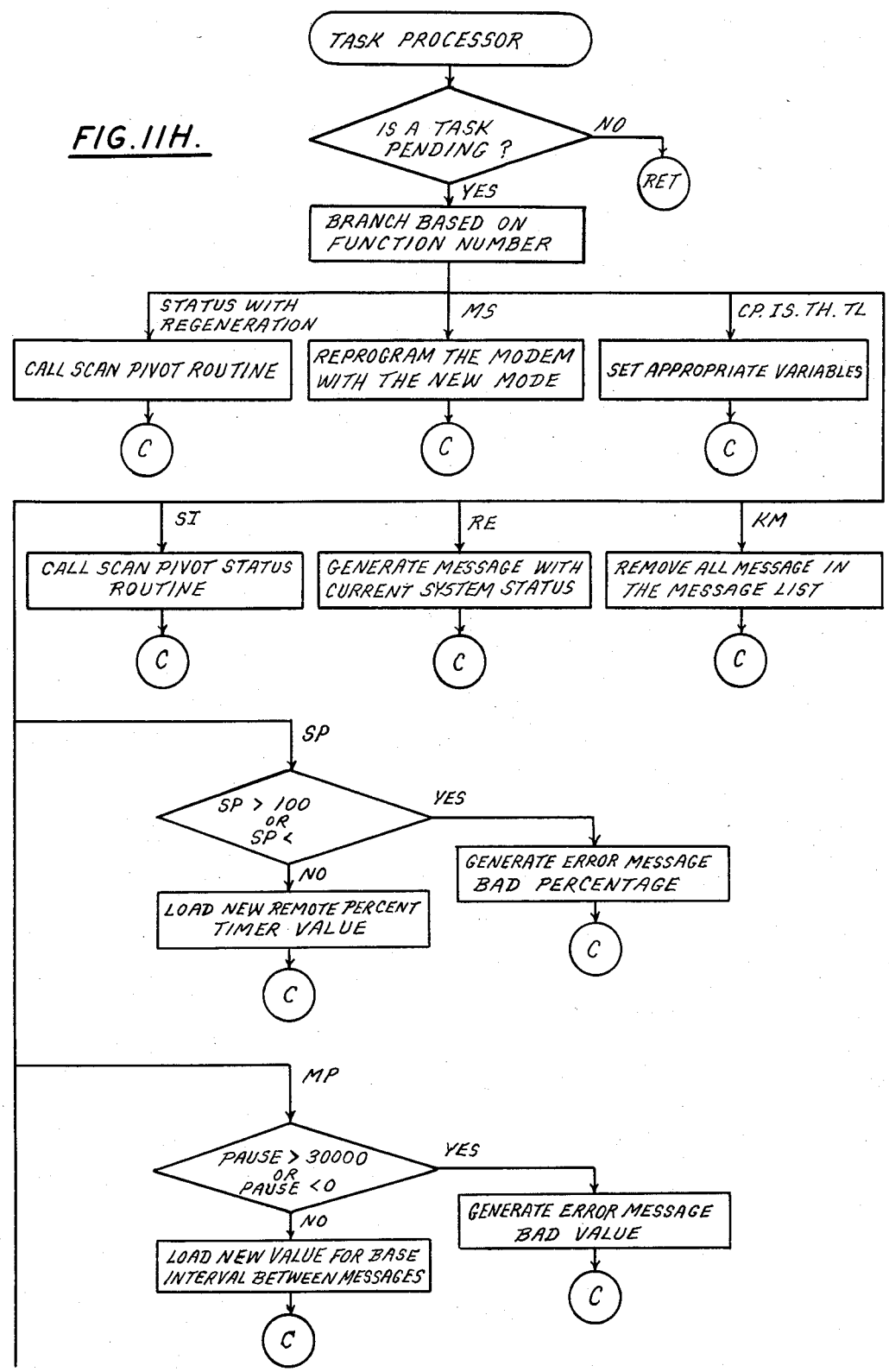
Figure 111:
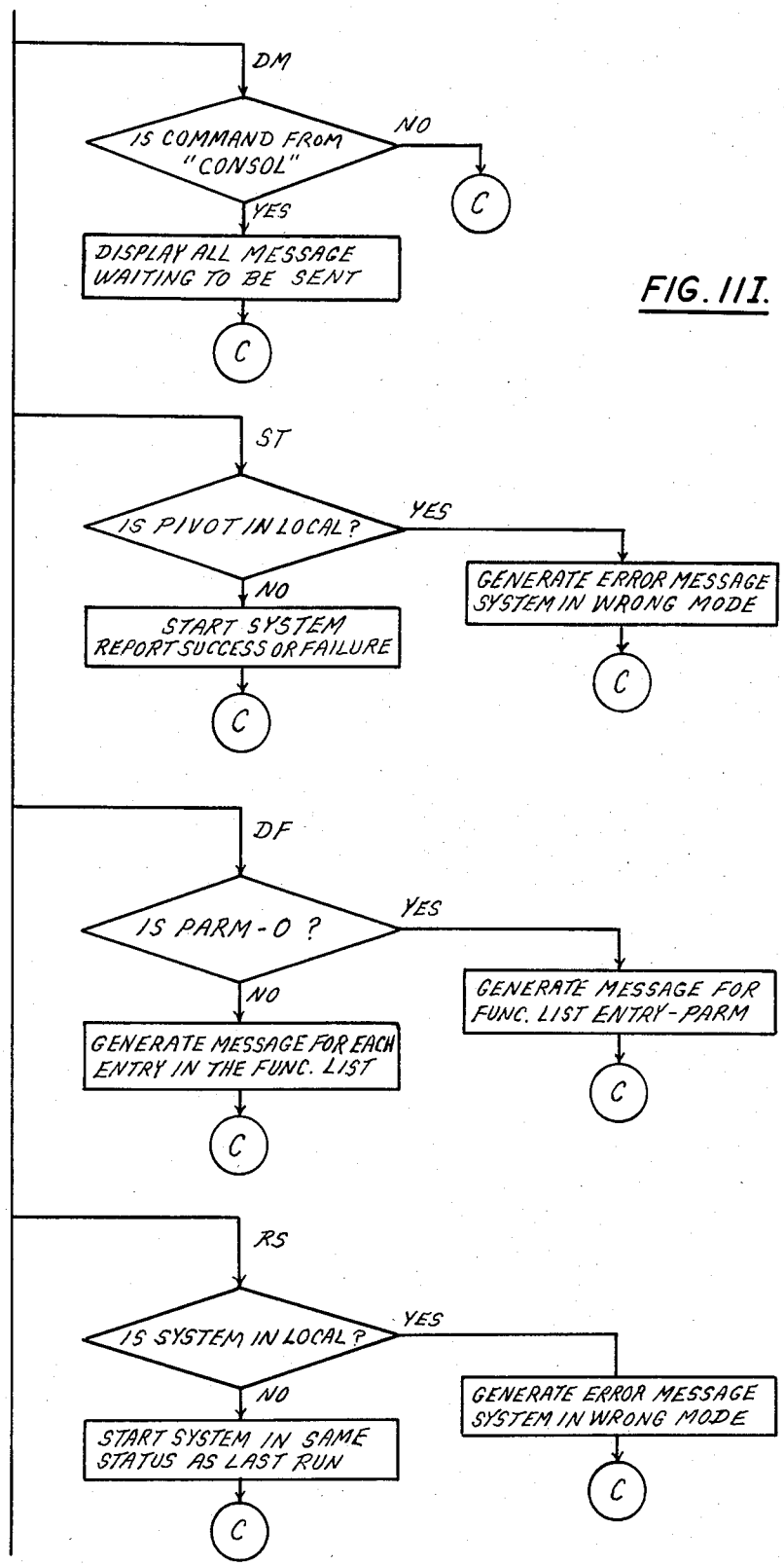
Figure 11J:
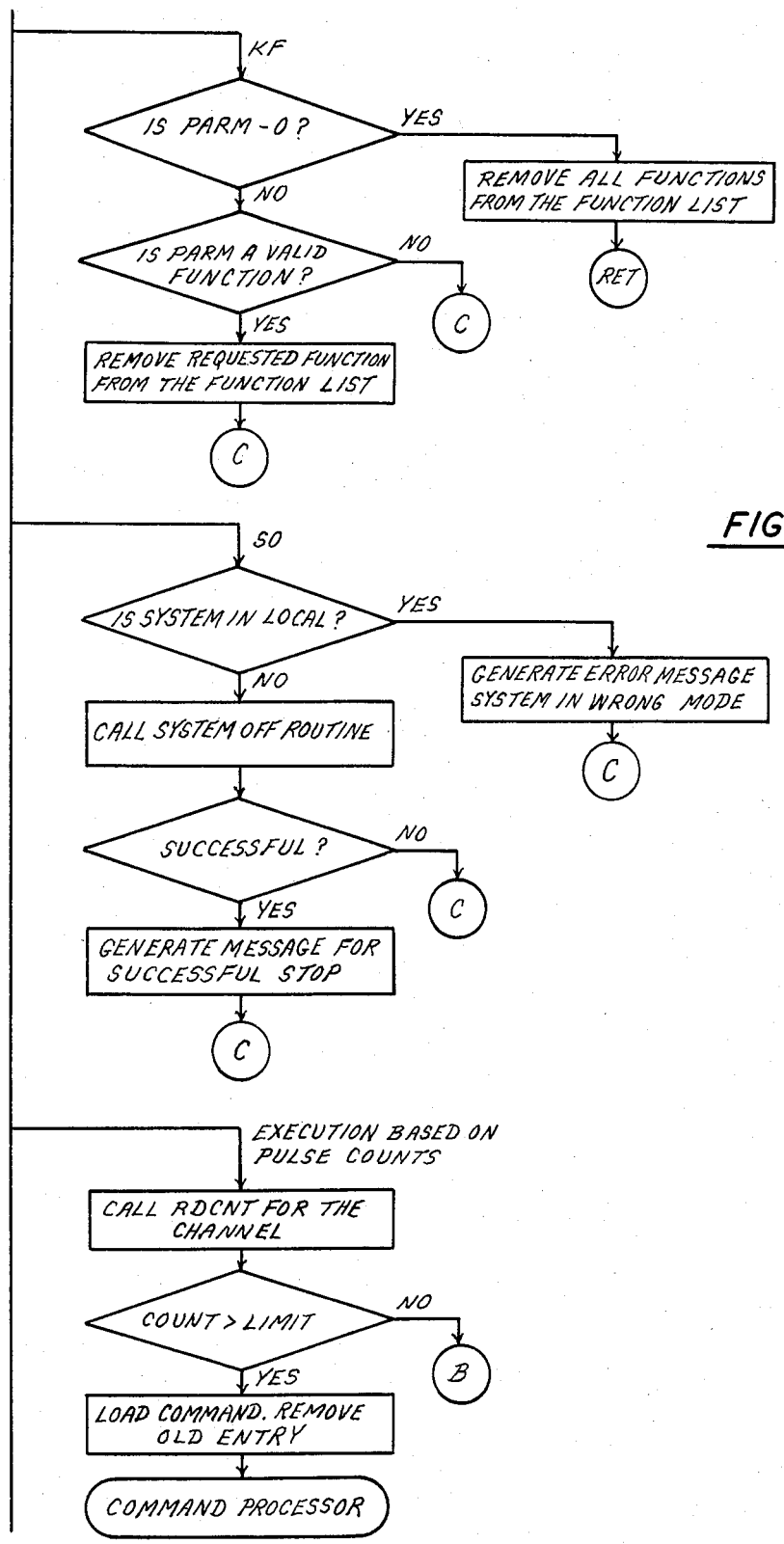
Figure 11L:
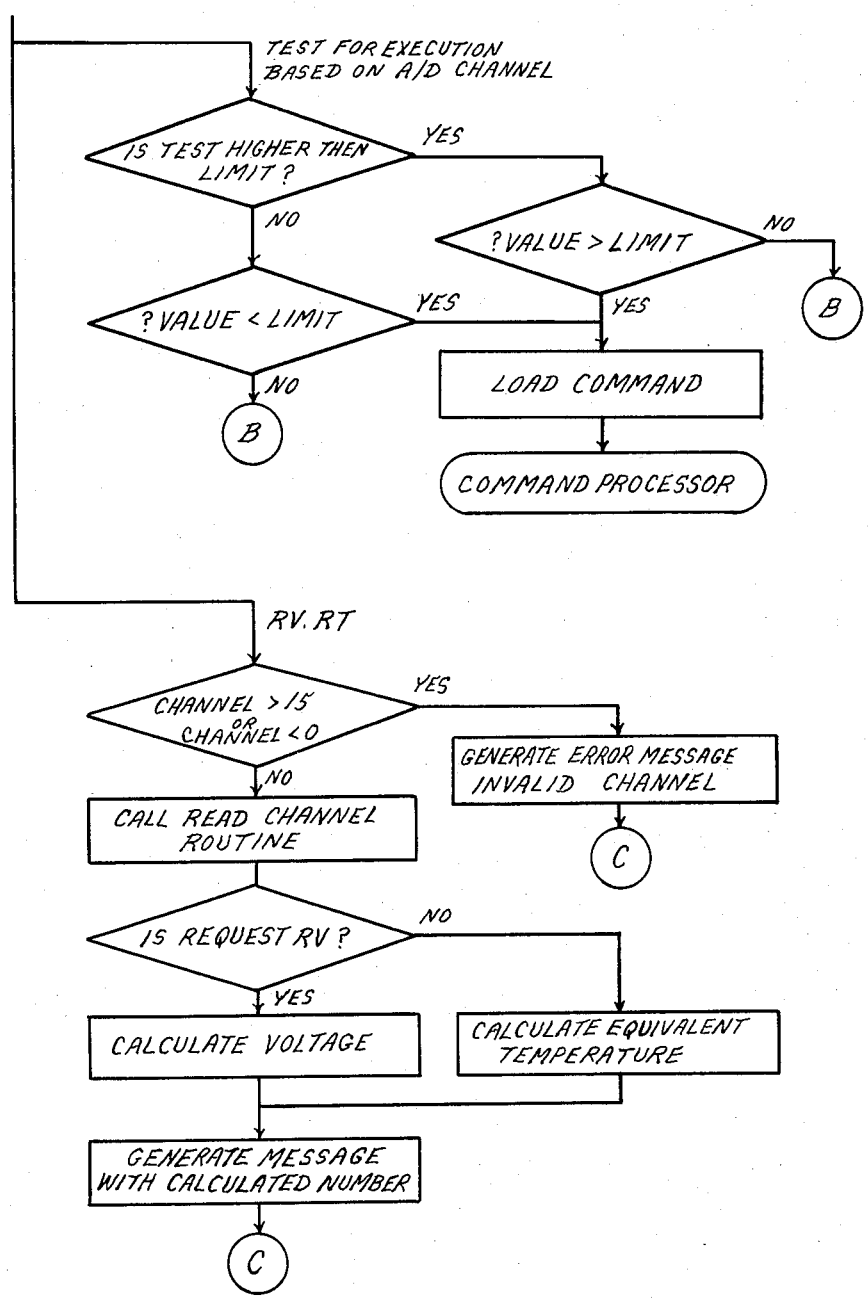

The flow chart for the stored program resident in the intelligent remote computer is shown in FIGS. 11a through 11l and independently controls its associated irrigation system through the pivot panel interface 88 shown in FIGS. 9a through 9e. This stored program is best understood by referring to the main loop, and assuming that the program is executed in the order that the subroutines are shown as the main loop is traversed in a clockwise manner. Program execution begins with power up or push button reset which initializes the hardware and the data structure and starts the program around the main loop. The next event is that the program reads the current time by executing the current time subroutine and returns to the main loop. This is followed sequentially as shown in FIG. 11a. The main subroutines which handle the desired instructions transmitted by the base station are the task processor subroutine and the command processor subroutine. It is believed that these subroutines are sufficiently detailed that they are self-explanatory, with the understanding that the two character command codes are identified in the appendix, and represent the shorthanded translation of the desired instruction generated by the base station in response to operator input. For certain commands, conditions can be requested by the operator at the base station and these conditions will be tested for before execution of the desired instruction by the stored program resident in the intelligent remote as shown in FIGS. 11a through 11l.

Various changes and modifications to this invention would be apparent to one of ordinary skill in the art. Those changes and modifications are included as part of this invention which is limited only by the scope of the claims appended hereto.

APPENDIX

| | | Multi-Pivot Monitor | | | | | | |
|---|---|---|---|---|---|---|---|---|
| I.D | Status | I.D. | Status | I.D. | Status | I.D. | Status | |
| 000000 | Off (L) | | | | | | | |
| TEST01 | N.R. | | | | | | | |
| LAB000 | Off (L) | | | | | | | |
| TEST02 | N.R. (L) | | | | | | | |
| VALMNT | Off | | | | | | | |

Enter Password?

| | | Multi-Pivot Monitor | | | | | | | |
|---|---|---|---|---|---|---|---|---|---|
| I.D. | Status | I.D. | Status | I.D. | Status | I.D. | Status | I.D. | Status |
| 000000 | Off (L) | | | | | | | | |
| TEST01 | N.R. | | | | | | | | |
| LAB000 | Off (L) | | | | | | | | |
| TEST02 | N.R. (L) | | | | | | | | |
| VALMNT | Off | | | | | | | | |

| Select Enter ID | | Sp Change | CR Execute | | Del Cancel | | Esc Log off | |
|---|---|---|---|---|---|---|---|---|
| 1Cont/Mon | 2NA 3Piv Ed | 4Base Ed | 5Review | 6Comm | 7New Piv | 8Opt Ed | 9Logoff | 10 Data |

TEST01 SYSTEM STATUS AND CONTROL
Description: Prototype RTU on Gene Hansen Property.

| Control | Remote | Stop in Slot | Normal |
|---|---|---|---|
| Status | No Response | Pressure | Wet |
| Direction | Forward | Pump Safety | Normal |
| Speed | 16% | Timer Control | Local |
| Application | 1.0(in.) | Time(Last Update) | 8/22/84 13:51:58 |
| Position | 5.4 Degrees | Temperature | 73.4(°F.) |
| | | Optional Parameters | |
| Hour Meter | 348.5 | Pressure Switch | Wet |
| Middle Box Temperature | 91.9 | | |

| Select | Sp Change | Del Cancel | CR Execute | Esc Exit |
|---|---|---|---|---|

Edit Pivot Data Display

| CODE | FUNCTION | CURRENT VALUE |
|---|---|---|
| A. | Identification | TEST01 |
| B. | Description | Prototype RTU on TEST01 Property. |
| C. | Base Station Assignment | VALLEY |
| D. | Low Temperature Limit | 40.0 |
| E. | High Temperature Limit | 160.0 |
| F. | Minimum Application | 0.16 |
| G. | Modem Mode | Answer |
| H. | Interval Between Reports While Running(min.) | 240 |
| I. | Report String | RE |
| J. | Start Sequence | RS ; |
| K. | Stop Sequence | SO ; |
| L. | Hour Meter | 348.5 |
| M. | Capture Reported Alarms | Yes |
| N. | Capture Reported Messages | Yes |

APPENDIX-continued

O. Capture Commands Sent out      No
P. Delete this Entry

Select    Enter Code    Sp Change    CR Execute    Del Cancel    Esc Exit

BASE STATION EDIT

| Code | Function | Current |
|---|---|---|
| A. | Identification | VALLEY |
| B. | Description | Base Station |
| C. | Modem Mode | Dial |
| D. | Interval between data saves (Sec.) | 3600 |
| E. | Number of times to send a message | 10 |
| F. | Base time between unacknowledged messages | 7 |
| G. | Carrier Delay (Sec.) | 1.0 |
| H. | One Second Delay Count | 2000 |
| I. | Background Color | 0 |
| J. | Foreground Color | 15 |
| K. | Low Intensity Color | 4 |
| L. | Units for Position | 1 |
| M. | Units for depth | 1 |
| N. | Units for Temperature | 1 |
| O. | Change Logon Password. | |

Select    Enter Code    Sp Change    CR Execute    Del Cancel    Esc Exit

```
RE
RE
AL    TEST01 RE 08/10/8415:19:12NWNOOOOLBOBOOLS312.7      84.2  27  50
RE
AL    TEST01 RE 08/10/8415:20:12NWNOOOOLBOBOOLS312.7      84.2  27  50
RE
AL    TEST01 RE 08/10/8415:22:12NWNOOOOLBOBOOLS312.7      84.5  27  50
AL    TEST01 RE 08/10/8415:22:12NWNOOOOLBOBOOLS312.7      84.5  27  50
RE
AL    TEST01 RE 08/10/8415:23:12NWNOOOOLBOBOOLS312.7      84.5  27  50
ME    TEST01 HOUR METER 121.2
SI
AL    TEST01 RE 24 R/C OP. R at 08/10/84 15:26:59
SD    F,;RS ;RE
Al    TEST01 RS System started at 08/10/84 15:27:32
AL    TEST01 RE 08/10/8415:27:12NWNOOOORBOBCOLR312.7      85.1  27  50
SI
AL    TEST01 RE 28 FWRD. O at 08/10/84 15:28:05
AL    TEST01 RE 31 SC S at 08/10/84 15:28:05
AL    TEST01 RE 31 SC S ar 08/10/84 15:28:05
SB    B,;SD F,;RS ;RE
AL    TEST01 RS System started at 08/10/84 15:30:09
SI
```

Esc or Func Key to Exit, Cntl-S to Hold, Cntl-P toggle Printer

TEST01 Optional Parameter Display
Description: Prototype RTU on Gene Hansen Property.

| | A/D Channels | | | | | | Pulse Channels | | | |
|---|---|---|---|---|---|---|---|---|---|---|
| 0. | N | | V | 1.0 | 0.0 | 0. | N | | 1.0 | 0.0 |
| 1. | N | | V | 1.0 | 0.0 | 1. | N | | 1.0 | 0.0 |
| 2. | N | | V | 1.0 | 0.0 | 2. | N | | 1.0 | 0.0 |
| 3. | Y Middle Box Temperatu | | T | 1.0 | 0.0 | 3. | N | | 1.0 | 0.0 |
| 4. | N | | V | 1.0 | 0.0 | | Hour Meter | | | |
| 5. | N | | V | 1.0 | 0.0 | | Display Yes | | | |
| 6. | N | | V | 1.0 | 0.0 | | Auxiliary Monitors | | | |
| 7. | N | | V | 1.0 | 0.0 | 1. | Y Pressure Switch | | | |
| 8. | N | | V | 1.0 | 0.0 | | Open | Dry Closed | Wet | |
| 9. | N | | V | 1.0 | 0.0 | 2. | N | | | |
| 10. | N | | V | 1.0 | 0.0 | | Open | Closed | | |
| 11. | N | | V | 1.0 | 0.0 | | Auxiliary Contacts | | | |
| 12. | N | | V | 1.0 | 0.0 | 1. | N | | | |
| 13. | N | | V | 1.0 | 0.0 | | Open | Closed | | |
| 14. | N | | V | 1.0 | 0.0 | 2. | N | | | |
| 15. | N | | V | 1.0 | 0.0 | | Open | Closed | | |

Select    Sp Change    CR Execute    Del Cancel    Esc Exit

REMOTE TERMINAL COMMAND LIST

| Command | Parameters | Description |
|---|---|---|
| A1 | [O/C],[Condition] | Auxiliary Contact #1 |
| A2 | [O/C],[Condition] | Auxiliary Contact #2 |
| AB | [ID] | Assign Base |
| AK | No Parameters | Acknowledge Command |
| AL | [message] | Alarm to Base |
| AP | [ID] | Assign Password |
| CL | No Parameters | Current Local Percent Timer |

APPENDIX-continued

| | | |
|---|---|---|
| CP | No Parameters | Current Position |
| CR | No Parameters | Current Remote Percent Timer |
| CT | No Parameters | Current Temperature |
| DF | [Function #],[Condition] | Display Function List |
| DM | [Condition] | Display Message List |
| DP | No Parameters | Display Password |
| FS | No Parameters | Displays the Amount of Free Space Available |
| HE | No Parameters | Help Message |
| I1 | No Parameters | Auxiliary Input #1 |
| I2 | No Parameters | Auxiliary Input #2 |
| IS | [Seconds],[Condition] | Interval Between Status (Sec) |
| KF | [Function #],[Condition] | Delete Function |
| KM | [Condition] | Delete Messages |
| ME | [message] | Message to Screen |
| MP | [Seconds],[Condition] | Minimum Message Pause |
| MS | [A/O],[Condition] | Modem Status |
| PC | [R/L],[Condition] | Percent Timer ControL |
| PO | [W/D],[Condition] | Pressure Switch Bypass |
| PS | [N/B],[Condition] | Pump Safety Bypass |
| RC | Channel,[Condition] | Read Pulse Count Channel |
| RE | [Condition] | Report System Status |
| RS | [Condition] | Restart System |
| RT | Channel,[Condition] | Read A/D Channel Temperature (F) |
| RV | Channel,[Condition] | Read A/D Channel Voltage (mV) |
| SA | [value], [Condition] | Set Application Rate |
| SB | [N/B],[Condition] | Stop in Slot Bypass |
| SC | No Parameters | System Control |
| SD | [F/R],[Condition] | System Direction |
| SF | Unit,Message | Store and Forward |
| SI | [Condition] | Status Immediate |
| SM | [value],[Condition] | Set Minimum Application |
| SO | [Condition] | System Off |
| SP | [value],[Condition] | Set Remote Percent Timer |
| SS | No Parameters | System Status |
| ST | [Condition],[direction(F/R)], [percent],[pressure(W/D)], [pump(N/B)],[sis(N/B)] [aux1(O/C)],(aux2(O/C)] | Start System |
| TH | [value],[Condition] | Temperature High Limit |
| TI | [New Time] | System Time |
| TL | [value],[Condition] | Temperature Low Limit |
| TS | [New Time] | System Time Set |
| ZQ | [Condition] | Software Reset |

What is claimed is:

1. A system for remotely monitoring and controlling at least one stored program controlled device comprising:

a base computer, a remote electromechanical device, said device having at lease one parameter to be controlled and monitored, a remote stored program controller, said controller having a stored program and means to independently monitor said at least one parameter and independently control said device in response to the monitoring of said at least one parameter in accordance with said stored program by monitoring and controlling said at least one parameter, a communications link between the base computer and the stored program controller, said base computer having means to request the controller to communicate information associated with said at least one parameter through said communications link to thereby monitor same, and said base computer having means to generate instructions and communicate same through said communications link to the controller for execution by its stored program to thereby alter the operation of the remote electromechanical device.

2. The system of claim 1 wherein the base computer further comprises means permitting operator input of instructions for execution by said stored program, said base computer having means to communicate upon operator command said desired instructions to the stored program controller and said stored program controller has means to immediately execute said desired instructions.

3. The system of claim 2 wherein the stored program controller has means to acknowledge to the base computer receipt and execution of said desired instruction prior to controlling of said device in accordance with the executed instructions, and the base computer has means to indicate to the operator receipt of the acknowledgement by the base computer.

4. The system of claim 1 wherein the desired instruction may be conditioned in accordance with the operating parameters monitored by the stored program controller.

5. The system of claim 1 wherein the electromechanical device has a local controller, the stored program controller having means to control the local controller, and wherein the local controller has means to accept operator input of desired changes to the at least one parameter, said stored program controller having means to accept and monitor said operator input changes.

6. The system of claim 5 further comprising means to disable the stored program controller for independent control of the electromechanical device by the local controller, and wherein the stored program controller has means to update its monitoring and resume control of the at least one parameter after said stored program controller has been returned to control of the local controller and the local controller has independently controlled the electromechanical device for a period of time.

7. The system of claim 1 further comprising a remote terminal unit, said remote terminal unit having means to physically connect to the stored program controller and generate desired instructions for execution by the stored program controller.

8. The system of claim 1 wherein the stored program controller is a computer.

9. The system of claim 1 wherein the base computer has means to periodically communicate with the stored program controller to request updated information associated with said at least one parameter.

10. The system of claim 1 wherein the stored program controller has a real time clock means independent of the base computer, and means to execute the stored program in accordance with its real time clock means.

11. The system of claim 1 wherein the means to request information and generate desired instructions includes a stored program in the base computer, the base computer having means to run another stored program without interfering with the independent monitor and control of the electromechanical device by the stored program controller.

12. The system of claim 1 wherein the base computer comprises a microcomputer with CRT display and keyboard.

13. The system of claim 1 wherein a plurality of stored program controllers are connected to the base computer by the communications link, at least one of the stored program controllers having means to relay base computer communication to and from another of said stored program controllers.

14. The system of claim 1 wherein a plurality of stored program controllers are connected to the base computer by the communications link, and each stored program controller has means to independently monitor and control a plurality of parameters associated with its associated electromechanical device.

15. The system of claim 14 wherein the base station has means to permit operator selection of a defined group of stored program controllers from which to request information.

16. The system of claim 15 wherein the base station has means to permit operator selection of a single parameter for a defined group of stored program controllers from which to request information.

17. The system of claim 14 wherein the base station has means to permit operator selection of a defined group of stored program controllers for which to generate desired instructions for execution by their associated stored program.

18. The system of claim 17 wherein the base station has means to permit operator selection of a single parameter for a defined group of stored program controllers for which to generate desired instructions for execution by their associated stored program.

19. A system for remotely monitoring and controlling a plurality of computer controlled irrigation systems by a base computer comprising:
a base computer,
a plurality of irrigation systems, each irrigation system having a plurality of operating parameters to be monitored and a plurality of operating parameters to be controlled,
each irrigation system having an associated computer, each irrigation system computer having means to independently monitor said operating parameters and independently control said irrigation system in response to the monitoring of the operating parameters associated with its associated irrigation system,
a communications link between the base computer and the irrigation system computer, the base computer having means to request the irrigation system computers to communicate information associated with each of its monitored operating parameters through said communications link to thereby monitor same and means to generate desired instructions for execution by the irrigation system computers and communicate said instructions thereto through said communications link to thereby alter the operation of the irrigation systems by altering their associated operating parameters.

20. The system of claim 19 wherein the irrigation system computers each have a stored program for monitoring and controlling said pluralities of operating parameters.

21. The system of claim 20 wherein the base computer further comprises means permitting operator input of desired instructions for execution by said plurality of stored programs, said base computer having means to communicate upon operator command said desired instructions to said plurality of irrigation system computers, and each of said irrigation system computers having means to immediately execute said desired instructions.

22. The system of claim 21 wherein the irrigation system computers have means to acknowledge to the base computer receipt and execution of said desired instruction prior to controlling of the irrigation system in accordance with the executed instructions, and the base computer has means to indicate to the operator receipt of the acknowledgement by the base computer.

23. The system of claim 22 wherein each irrigation system has a local controller, each irrigation system computer having means to control the local controller, and wherein the local controller has means to accept operator input of desired changes to the pluralities of operating parameters, the irrigation system computer having means to accept and monitor said operator input changes.

24. The system of claim 23 further comprising means permitting release of the irrigation system from irrigation system computer control for independent control of the irrigation system by the local controller, and wherein each irrigation system computer has means to update its monitoring and resume control of the pluralities of operating parameters after it has been returned to control of the local controller and the local controller has independently controlled the irrigation system for a period of time.

25. The system of claim 24 wherein at least one of said irrigation systems comprises a center pivot irrigation system.

26. The system of claim 19 further comprising an interface means between each of said irrigation system computers and its associated local controller, said interface means including a latching means to latch in a preselected condition in response to the output of the irrigation system computer, said latching means having means to maintain said preselected condition until said output is changed by said irrigation system computer.

27. The system of claim 26 wherein the interface means further comprises means to indicate the condition of the latching means, said indication means being connected to the irrigation system computer to thereby indicate the condition of the latching means back to the irrigation system computer.

28. The system of claim 27 wherein the latching means comprises a plurality of latching relays and wherein the indicating means comprises a plurality of resistors connected in series with said latching relays.

29. The system of claim 26 wherein the interface means further comprises means to enable the latching means for irrigation system computer control.

30. The system of claim 20 wherein each irrigation system computer has means to receive and store a plurality of base computer generated desired instructions, and means to systematically and independently execute these desired instructions in accordance with its stored program.

31. The system of claim 19 wherein the base computer has means to periodically communicate with the irrigation system computers to request updated information associated with said monitored operating parameters.

32. The system of claim 20 wherein the irrigation system computers each have a real time clock means independent of the base computer, and each irrigation system computer has means to execute its stored program in accordance with its real time clock means.

33. The system of claim 20 wherein the means to request communication of information and to generate desired instructions includes a stored program in the base computer, the base computer having means to run another stored program without interfering with the independent monitor and control of each irrigation system by its associated irrigation system computer.

34. The system of claim 33 wherein the base computer has an associated real time clock means independent of the real time clock means associated with the irrigation system computers.

35. The system of claim 19 wherein at least one of the irrigation system computers has means to relay base computer communications to and from another of said irrigation system computers.

36. The system of claim 19 wherein each irrigation system has an associated local controller, each irrigation system computer effecting control of the irrigation system through the associated local controller, and further comprising interface means connected between each irrigation system computer and its associated local controller, the interface means having means to release the local controller from irrigation system computer control.

37. The system of claim 36 wherein the interface means further comprises latch means, the irrigation system computer having means to set said latch means for desired conditions of operating parameters, and wherein the means to release said local controller from irrigation system computer control includes means to reset said latch means.

38. The system of claim 37 wherein the interface means further comprises means to indicate the condition of said latch means to said irrigation system computer, said irrigation system computer having means to compare the indicated latch condition with the indicated parameter condition and generate an alarm signal in response thereto.

39. The system of claim 19 wherein the communications link comprises a radio tansmitter/receiver and a modem associated with each of the base computer and the irrigation system computers.

40. The system of claim 20 wherein the base computer has means to generate instructions conditioned upon the operating parameters monitored by the irrigation system computer, and the irrigation system computer stored program has means to execute said instructions in accordance with the occurrence of the condition.

* * * * *